(12) United States Patent
Ma et al.

(10) Patent No.: US 10,949,780 B2
(45) Date of Patent: Mar. 16, 2021

(54) ONLINE TRANSPORTATION RESERVATION SYSTEMS PRIORITIZING RESERVATIONS BASED ON DEMAND, REGIONAL TRANSPORTATION CAPACITY, AND HISTORICAL DRIVER SCORES

(71) Applicant: BEIJING DIDI INFINITY TECHNOLOGY AND DEVELOPMENT CO., LTD., Beijing (CN)

(72) Inventors: Ning Ma, Beijing (CN); Xie Li, Beijing (CN); Wei Zhao, Beijing (CN); Biao Ma, Beijing (CN); Tihui Zhang, Beijing (CN); Xiaoxue Zhang, Beijing (CN); Cheng Lyu, Beijing (CN); Chao Guan, Beijing (CN); Bo Liu, Beijing (CN); Lin Liu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/745,382

(22) Filed: Jan. 17, 2020

(65) Prior Publication Data
US 2020/0151632 A1    May 14, 2020

Related U.S. Application Data

(63) Continuation of application No. PCT/CN2018/093114, filed on Jun. 27, 2018.

(30) Foreign Application Priority Data

Jul. 18, 2017    (CN) .......................... 201710585426.1

(51) Int. Cl.
*G06Q 10/06*    (2012.01)
(52) U.S. Cl.
CPC .............................. *G06Q 10/06311* (2013.01)
(58) Field of Classification Search
CPC ............ G06Q 10/06311; G06Q 10/06; G06Q 10/06315; G06Q 10/063114; G06Q 50/30
See application file for complete search history.

(56) References Cited

U.S. PATENT DOCUMENTS 5,835,376 A * 11/1998 Smith .................... G06Q 10/08
                                                                701/117
5,945,919 A *  8/1999 Trask .................... G08G 1/202
                                                                235/384
(Continued)

FOREIGN PATENT DOCUMENTS

CN    104157133 A    11/2014
CN    105095976 A    11/2015
(Continued)

OTHER PUBLICATIONS

International Search Report in PCT/CN2018/093114 dated Sep. 27, 2018, 4 pages.
(Continued)

*Primary Examiner* — Scott L Jarrett
(74) *Attorney, Agent, or Firm* — Metis IP LLC

(57)    ABSTRACT

Systems and methods for determining an order accepting mode for a target service provider are provided. A method includes receiving a request for determining an order accepting mode for the target service provider. The method also includes obtaining an order accepting evaluation parameter with respect to the target service provider in response to the request. The method also includes determining an order accepting mode for the target service providers based on the order accepting evaluation parameter. The order accepting
(Continued)

mode includes at least one of an order designating mode, an order striving mode, or an order quick-accepting mode.

20 Claims, 24 Drawing Sheets

(56) References Cited

U.S. PATENT DOCUMENTS

| | | | | |
|---|---|---|---|---|
| 6,253,129 B1* | 6/2001 | Jenkins | ................ | G07C 5/008 |
| | | | | 340/438 |
| 6,615,046 B1* | 9/2003 | Ur | ................ | H04W 84/08 |
| | | | | 455/422.1 |
| 6,756,913 B1* | 6/2004 | Ayed | ................ | G06Q 10/02 |
| 7,313,530 B2* | 12/2007 | Smith | ................ | G06Q 10/04 |
| | | | | 705/7.24 |
| 7,363,126 B1* | 4/2008 | Zhong | ................ | G01C 21/3484 |
| | | | | 340/992 |
| 7,627,422 B2* | 12/2009 | Adamczyk | ................ | G06Q 10/06 |
| | | | | 701/516 |
| 7,828,202 B2* | 11/2010 | Bregman | ................ | G06Q 10/087 |
| | | | | 235/376 |
| 8,315,802 B2* | 11/2012 | Brown | ................ | G01C 21/3415 |
| | | | | 701/533 |
| 8,442,848 B2* | 5/2013 | Myr | ................ | G06Q 10/04 |
| | | | | 705/6 |
| 8,706,542 B2* | 4/2014 | O'Meara | ................ | G06Q 10/06 |
| | | | | 705/7.16 |
| 9,230,292 B2* | 1/2016 | Amin | ................ | H04W 4/029 |
| 9,536,271 B2* | 1/2017 | Kalanick | ................ | B60Q 1/50 |
| 9,626,639 B2* | 4/2017 | Gibbon | ................ | G06Q 10/083 |
| 9,843,897 B1* | 12/2017 | Lin | ................ | G06Q 50/10 |
| 10,133,995 B1* | 11/2018 | Reiss | ................ | G06Q 50/01 |
| 10,157,396 B1* | 12/2018 | Phillips | ................ | G06Q 30/0201 |
| 10,248,913 B1* | 4/2019 | Gururajan | ................ | G06Q 10/02 |
| 10,346,889 B1* | 7/2019 | Reiss | ................ | H04W 4/35 |
| 10,467,563 B1* | 11/2019 | Mo | ................ | G06F 16/29 |
| 10,586,273 B1* | 3/2020 | Kohli | ................ | H04W 4/025 |
| 2001/0018628 A1* | 8/2001 | Jenkins | ................ | G08G 1/202 |
| | | | | 701/33.4 |
| 2002/0188492 A1* | 12/2002 | Borton | ................ | G06Q 30/0202 |
| | | | | 705/7.13 |
| 2003/0182413 A1* | 9/2003 | Allen | ................ | H04L 12/14 |
| | | | | 709/223 |
| 2004/0210621 A1* | 10/2004 | Antonellis | ................ | G06Q 10/087 |
| | | | | 709/200 |
| 2004/0219933 A1* | 11/2004 | Faith | ................ | H04W 4/029 |
| | | | | 455/456.3 |
| 2006/0059023 A1* | 3/2006 | Mashinsky | ................ | G06Q 10/02 |
| | | | | 705/5 |
| 2006/0099963 A1* | 5/2006 | Stephens | ................ | H04W 4/029 |
| | | | | 455/456.3 |
| 2008/0313002 A1* | 12/2008 | McFarland | ................ | G06Q 30/018 |
| | | | | 705/304 |
| 2009/0048890 A1* | 2/2009 | Burgh | ................ | G06Q 10/06316 |
| | | | | 705/7.15 |
| 2009/0254405 A1* | 10/2009 | Hollis | ................ | G06Q 10/06315 |
| | | | | 705/7.25 |
| 2010/0153279 A1* | 6/2010 | Zahn | ................ | G06Q 10/08355 |
| | | | | 705/80 |
| 2012/0041675 A1* | 2/2012 | Juliver | ................ | G06Q 30/0283 |
| | | | | 701/465 |
| 2012/0323622 A1* | 12/2012 | Scott | ................ | G06Q 10/063114 |
| | | | | 705/7.14 |
| 2014/0278635 A1* | 9/2014 | Fulton | ................ | G06Q 10/063112 |
| | | | | 705/7.14 |
| 2015/0161564 A1* | 6/2015 | Sweeney | ................ | G06Q 50/30 |
| | | | | 705/338 |
| 2015/0262121 A1* | 9/2015 | Riel-Dalpe | ................ | G06Q 10/08 |
| | | | | 705/15 |
| 2015/0339923 A1 | 11/2015 | Godafoss et al. | | |
| 2016/0307288 A1* | 10/2016 | Yehuda | ................ | G06Q 30/0613 |
| 2017/0046653 A1* | 2/2017 | Wilson | ................ | G06Q 10/083 |
| 2017/0132713 A1 | 5/2017 | Bowne et al. | | |
| 2017/0193625 A1* | 7/2017 | Fan | ................ | G06Q 50/01 |
| 2017/0293950 A1 | 10/2017 | Rathod | | |
| 2017/0330127 A1* | 11/2017 | Koltunov | ................ | G06Q 10/063114 |
| 2018/0096300 A1* | 4/2018 | Boye | ................ | G06Q 30/0283 |
| 2018/0315319 A1* | 11/2018 | Spector | ................ | G06Q 50/28 |
| 2019/0132699 A1* | 5/2019 | Nikulkov | ................ | H04W 4/35 |
| 2020/0120037 A1* | 4/2020 | Zhang | ................ | G06Q 50/30 |
| 2020/0134767 A1* | 4/2020 | Zhang | ................ | G06Q 10/0631 |

FOREIGN PATENT DOCUMENTS

| | | |
|---|---|---|
| CN | 105139228 A | 12/2015 |
| CN | 105405285 A | 3/2016 |
| CN | 105489001 A | 4/2016 |
| CN | 106296552 A | 1/2017 |
| CN | 106372674 A | 2/2017 |
| CN | 106372754 A | 2/2017 |
| CN | 205971151 U | 2/2017 |
| JP | 2012014469 A | 1/2012 |

OTHER PUBLICATIONS

Written Opinion in PCT/CN2018/093114 dated Sep. 27, 2018, 4 pages.
First Examination Report in Australian Application No. 2018304331 dated Nov. 20, 2020, 8 pages.

* cited by examiner

ONLINE TRANSPORTATION RESERVATION SYSTEMS PRIORITIZING RESERVATIONS BASED ON DEMAND, REGIONAL TRANSPORTATION CAPACITY, AND HISTORICAL DRIVER SCORES

CROSS-REFERENCE TO RELATED APPLICATIONS

This application is a continuation of International Application No. PCT/CN2018/093114 filed on Jun. 27, 2018, which claims priority to Chinese Application No. 201710585426.1 filed on Jul. 18, 2017, the entire contents of which are hereby incorporated by reference.

TECHNICAL FIELD

The present disclosure generally relates to systems and methods for processing taxi hailing orders of the online to offline services, and in particular, to systems and methods for determining an order accepting mode for a user of the online to offline services.

BACKGROUND

Online to offline services, such as online taxi hailing services, utilizing Internet technology have become increasingly popular because of their convenience. Determining suitable order accepting mode for online taxi drivers is very important for the online taxi drivers and the service provider to efficiently serve the users. When the online taxi drivers are not in suitable order accepting mode, it may affect the service quality and deteriorate the user experience of the online to offline service. Therefore, it is desirable to provide efficient systems and methods for determining order accepting mode for drivers.

SUMMARY

In one aspect of the present disclosure, a system is provided. The system may be configured to operate an online to offline service platform. The system may include at least one storage medium including a first set of instructions for determining an order accepting mode for a service provider terminal associated with the online to offline service platform. The system may also include at least one processor in communication with the at least one storage medium, wherein when executing the first set of instructions, the at least one processor is directed to: receive a request for determining an order accepting mode for a target service provider terminal; obtain an order accepting evaluation parameter with respect to a target service provider associated with the target service provider terminal in response to the request; and determine an order accepting mode for the target service provider based on the order accepting evaluation parameter. The order accepting mode includes at least one of an order designating mode, an order striving mode, or an order quick-accepting mode.

In some embodiments, the order accepting evaluation parameter includes at least one of a historical driving score associated with the target service provider or a transport capacity of a geographical region in which the service provider terminal associated with the target service provider is located.

In some embodiments, the request for determining the order accepting mode includes a request for logging in the system.

In some embodiments, to determine the order accepting mode for the target service provider based on the order accepting evaluation parameter, the at least one processor is directed to: compare the historical driving score associated with the target service provider with a first threshold and a second threshold; in response to a determination that the driving score associated with the target service provider is smaller than the first threshold, designate the order quick-accepting mode as the order accepting mode for the target service provider; in response to a determination that the order driving score associated with the target service provider is larger than or equal to the first threshold and is smaller than or equal to the second threshold, designate the order designating mode as the order accepting mode for the target service provider; and in response to a determination that the historical driving score associated with the target service provider is larger than the second threshold, designate the order striving mode as the order accepting mode for the target service provider.

In some embodiments, the historical driving score associated with the target service provider is determined based on historical service data associated with the target service provider, a historical transaction rate associated with the target service provider, and a driving score estimation model.

In some embodiments, to determine the order accepting mode for the target service provider based on the order accepting evaluation parameter, the at least one processor is directed to: determine a first number of available service providers corresponding to the transport capacity of the geographical region; determine whether the first number of available service providers is larger than or equal to a capacity threshold; in response to a determination that the first number of available service providers is larger than or equal to the capacity threshold, designate the order striving mode as the order accepting mode for the target service provider; and in response to a determination that the first number of available service providers is smaller than the capacity threshold, designate the order designating mode as the order accepting mode for the target service provider.

In some embodiments, to determine the order accepting mode for the target service provider based on the order accepting evaluation parameter, the at least one processor is directed to: determine a first number of unprocessed orders corresponding to the transport capacity of the geographical region; determine whether the first number of unprocessed orders is larger than or equal to an order threshold; in response to a determination that the first number of unprocessed orders is larger than or equal to the order threshold, designate the order quick-accepting mode as the order accepting mode for the target service provider; and in response to a determination that the first number of unprocessed orders is smaller than the order threshold, designate the order designating mode as the order accepting mode for the target service provider.

In some embodiments, the request for determining the order accepting mode includes a mode switching request for switching the order accepting mode associated with the target service provider from the order designating mode to the order striving mode, and to determine the order accepting mode for the target service provider based on the order accepting evaluation parameter, the at least one processor is directed to: determine whether the number of available service providers corresponding to the transport capacity is larger than a capacity threshold; and in response to the determination that the available service providers corresponding to the transport capacity is larger than the capacity threshold, switch the order accepting mode from the order designating mode to the order striving mode.

In some embodiments, to determine the order accepting mode for the target service provider based on the order accepting evaluation parameter, the at least one processor is directed to: determine whether the historical driving score associated with the target service provider is larger than or equal to a second threshold; and in response to the determination that the historical driving score associated with the target service provider is larger than or equal to the second threshold, switch the order accepting mode from the order designating mode to the order striving mode.

In some embodiments, at least one processor is further directed to instruct the target service provider terminal to display an initial order accepting interface based on the determined order accepting mode.

In some embodiments, when the determined order accepting mode is the order designating mode, the at least one processor is further directed to instruct the target service provider terminal to display time information relating to an order in a first region of the initial order accepting interface, and an order accepting identifier in a second region of the initial order accepting interface, or when the determined order accepting mode is the order striving mode or the order quick-accepting mode, the at least one processor is further directed to instruct the target service provider terminal to display distance information relating to an order in the first region of the initial order accepting interface, and an order striving identifier in the second region of the initial order accepting interface.

In some embodiments, under the order designating mode, an order is transmitted via the online to offline service platform to a service provider terminal, and designated to the service provider terminal upon receiving an acceptance of the order in a predetermined time period.

In some embodiments, under the order striving mode, an order is broadcasted via the online to offline service platform to a plurality of service provider terminals, and designated to a service provider terminal of the plurality of service provider terminals that responds first.

In some embodiments, under the order quick-accepting mode, an order is directly designated to a service provider terminal.

In some embodiments, the at least one storage medium further includes a second set of instructions for broadcasting a target order, wherein when the at least one processor executes the second set of instructions, the at least one processor is further directed to: receive a target order from a service requester terminal, wherein the target order is associated with a target starting location; determine an order broadcasting mode for the target order; identify a plurality of candidate service provider terminals within a predetermined range around the target starting location; for each of the plurality of candidate service provider terminals, execute the first set of instructions to determine an order accepting mode; identify, from the plurality of candidate service provider terminals, one or more service provider terminals having an order accepting mode corresponding to the order broadcasting mode for the target order; and broadcasting the target order to the one or more identified service provider terminals.

In some embodiments, to determine the order broadcasting mode for the target order, the at least one processor is further directed to: determine a target transport capacity of a target geographical region around the target starting location; and determine the order broadcasting mode for the target order based on the target transport capacity of the target geographical region.

In some embodiments, to determine the order broadcasting mode for the target order based on the target transport capacity of the target geographical region, the at least one processor is further directed to: determine a second number of available service providers corresponding to the target transport capacity of the target geographical region; determine whether the second number of available service providers is larger than or equal to a capacity threshold; in response to a determination that the second number of available service providers is larger than or equal to the capacity threshold, designate a first broadcasting mode corresponding to an order striving mode as the order broadcasting mode for the target order; and in response to a determination that the second number of available service providers is smaller than the capacity threshold, designate a second broadcasting mode corresponding to the order designating mode as the order broadcasting mode for the target order.

In some embodiments, to determine the order broadcasting mode for the target order based on the target transport capacity of the target geographical region, the at least one processor is further directed to: determine a second number of unprocessed orders corresponding to the target transport capacity of the target geographical region; determine whether the second number of unprocessed orders is larger than or equal to an order threshold; in response to a determination that the second number of unprocessed orders is larger than or equal to the order threshold, designate a third broadcasting mode corresponding to the order quick-accepting mode as the order broadcasting mode for the target order; and in response to a determination that the number of unprocessed orders is smaller than the order threshold, designate a second broadcasting mode corresponding to the order designating mode as the order broadcasting mode for the target order.

In another aspect of the present disclosure, a method for determining an order accepting mode is provided. The method may be implemented on a computing device having at least one processor, at least one storage medium, and an online to offline service platform connected to a network. The method may include receiving a request for determining an order accepting mode for a target service provider terminal; obtaining an order accepting evaluation parameter with respect to a target service provider associated with the target service provider terminal in response to the request; and determining an order accepting mode for the target service provider based on the order accepting evaluation parameter.

In still another aspect of the present disclosure, a non-transitory computer readable medium is provided. The non-transitory computer readable medium may include at least one set of instructions for determining an order accepting mode for a service provider when executed by at least one processor of a computer device, the at least one set of instructions directs the at least one processor to: receive a request for determining an order accepting mode for a target service provider terminal; obtain an order accepting evaluation parameter with respect to a target service provider associated with the target service provider terminal in response to the request; and determine an order accepting mode for the target service provider based on the order accepting evaluation parameter.

In still another aspect of the present disclosure, a system configured to operate an online to offline service platform is provided. The system may include a request obtaining module configured to receive a request for determining an order accepting mode for a target service provider terminal; an evaluation parameter determination module configured to obtain an order accepting evaluation parameter with respect to a target service provider associated with the target service provider terminal in response to the request; and an order accepting mode determination module configured to determine an order accepting mode for the target service provider based on the order accepting evaluation parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
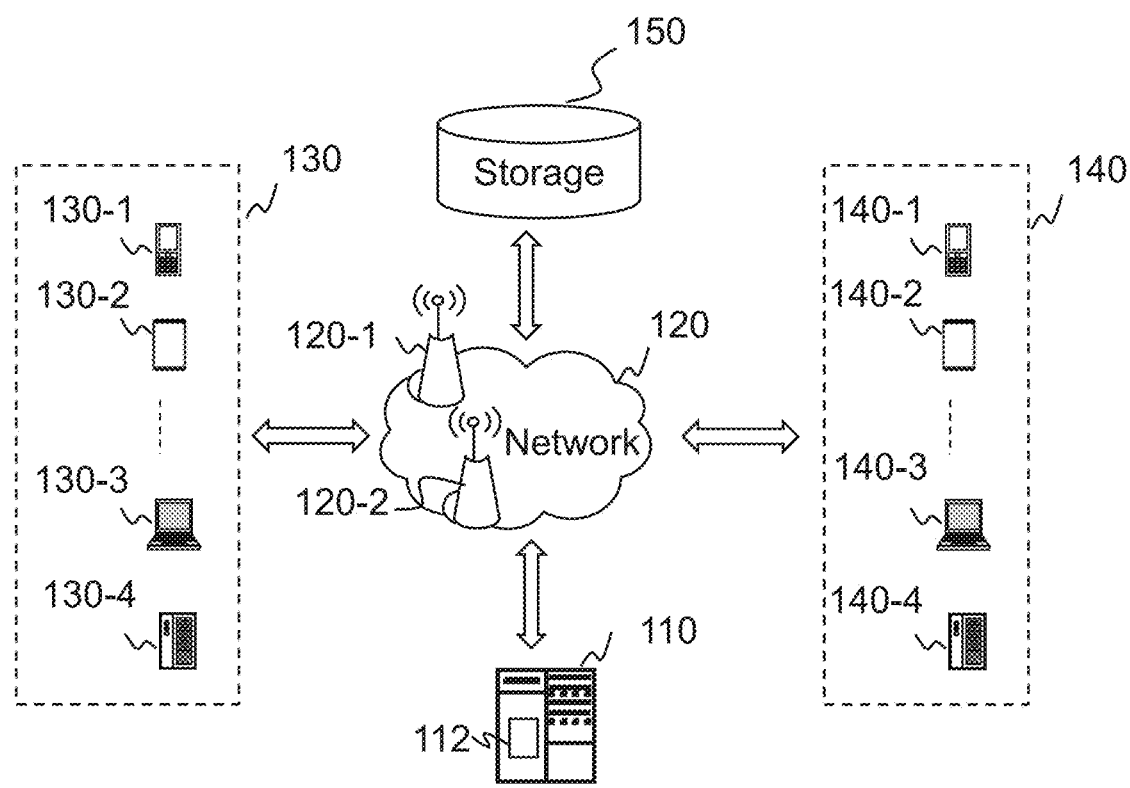
FIG. 1 is a block diagram of an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding determining an order accepting mode for a target service provider and determining an order broadcasting mode for a target order, it should also be understood that this is only one exemplary embodiment. The system or method of the present disclosure may be applied to user of any other kind of online to offline service platform. For example, the system or method of the present disclosure may be applied to users in different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The service starting points in the present disclosure may be acquired by a positioning technology embedded in a wireless device (e.g., the passenger terminal, the service provider terminal, etc.). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure. For example, the GPS-based method and the WiFi-based method may be used together as positioning technologies to locate the wireless device.

An aspect of the present disclosure relates to an online to offline service systems and/or methods with artificial intelligence for determining an order accepting mode for a target service provider. To this end, the online to offline service systems may first receive a request (e.g., from a service provider terminal) for determining the order accepting mode. The online to offline service systems may obtain an order accepting evaluation parameter with respect to the target service provider associated with the target service provider terminal in response to the request. The order accepting evaluation parameter may include a historical driving score associated with the target service provider or transport capacity of a geographical region. Then the online to offline service systems may determine the order accepting mode for the target service provider based on the historical driving score or the transport capacity. The online to offline service systems may broadcast or distribute orders to service providers based on the order accepting modes of the service provides. Therefore, the determination of the order accepting mode for different service providers is more in line with actual needs and meets needs of different service providers, thereby improving the operating efficiency of the online to offline service platform.

It should be noted that the present solution relies on collecting data (e.g., location information) relating to a user terminal (e.g., a service requester terminal, a service provider terminal) registered with an online to offline system, which is a new form of data collecting means rooted only in post-Internet era. It provides detailed information of a user terminal that could raise only in post-Internet era. In pre-Internet era, GPS is not available and it is impossible to obtain millions of thousands of user terminals' locations in real-time and/or substantially real-time. The online to offline service, however, allows the online to offline service system to monitor millions of thousands of user terminals' locations in real-time and/or substantially real-time using GPS, and then provide better service scheme based on the locations of the user terminals. Therefore, the present solution is deeply rooted in and aimed to solve a problem only occurred in post-Internet era.

FIG. 1 is a block diagram of an exemplary online to offline service system according to some embodiments of the present disclosure. For example, the online to offline service system 100 may be an online transportation service platform for transportation services such as taxi hailing service, chauffeur service, express car service, carpool service, bus service, driver hire, and shuttle service. The online to offline service system 100 may include a server 110, a network 120, a service requester terminal 130, a service provider terminal 140, and a storage 150. The server 110 may include a processing engine 112.

The server 110 may process information and/or data relating to a service request. The service request may include a request for determining an order accepting mode (also referred to herein as a mode determination request) for a target service provider, a request for determining whether to switch an order accepting mode (also referred to herein as a mode switching request) for a target service provider, a request for determining an order broadcasting mode for a target order, or the like, or any combination thereof. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the service requester terminal 130, the service provider terminal 140, and/or the storage 150 via the network 120. As another example, the server 110 may be directly connected to the service requester terminal 130, the service provider terminal 140, and/or the storage 150 to access information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the service request to perform one or more functions of the server 110 described in the present disclosure. For example, the processing engine 112 may obtain an order accepting evaluation parameter with respect to a target service provider and determine an order accepting mode for the target service provider based on the order accepting evaluation parameter. As another example, the processing engine 112 may determine whether to switch an order accepting mode for a target service provider. As still another example, the processing engine 112 may determine an order broadcasting mode for a target order. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online to offline service system 100 (e.g., the server 110, the service requester terminal 130, the service provider terminal 140, and/or the storage 150) may transmit information and/or data to other component(s) in the online to offline service system 100 via the network 120. For example, the server 110 may obtain/acquire service request data from the service requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or Internet exchange points 120-1, 120-2, . . . , through which one or more components of the online to offline service system 100 may be connected to the network 120 to exchange data and/or information.

The service requester terminal 130 may be used by a user (e.g., a passenger) to request an online to offline service (e.g., a transportation service). For example, a user of the service requester terminal 130 may use the service requester terminal 130 to transmit a service request for himself/herself or another user, or receive service and/or information or instructions from the server 110. The service provider terminal 140 may be used by a service provider (e.g., a driver) to reply an online to offline service (e.g., a transportation service). For example, a user of the service provider terminal 140 may use the service provider terminal 140 to receive a service request from the service requester terminal 130, and/or information or instructions from the server 110. In some embodiments, the terms "passenger," "customer," "service requestor," and "service requester" may be used interchangeably, and the terms "driver" and the "service provider" may be used interchangeably. In some embodiments, the user may refer to a service requester or a service provider according to a specific situation. In some embodiments, the terms "user terminal," "passenger terminal," "service requester terminal," and "service requester terminal" may be used interchangeably. In some embodiments, the terms "user terminal," "driver terminal," and "service provider terminal" may be used interchangeably.

In some embodiments, the service requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the service requester terminal 130 may be a wireless device with positioning technology for locating the position of the user and/or the service requester terminal 130.

In some embodiments, the service provider terminal 140 may be similar to, or the same device as the service requester terminal 130. In some embodiments, the service provider terminal 140 may be a wireless device with positioning technology for locating the position of the driver and/or the service provider terminal 140. In some embodiments, the service requester terminal 130 and/or the service provider terminal 140 may communicate with other positioning device to determine the position of the passenger, the service requester terminal 130, the driver, and/or the service provider terminal 140. In some embodiments, the service requester terminal 130 and/or the service provider terminal 140 may transmit positioning information to the server 110.

The storage 150 may store data and/or instructions. In some embodiments, the storage 150 may store data obtained/acquired from the service requester terminal 130 and/or the service provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the online to offline service system 100 (e.g., the server 110, the service requester terminal 130, the service provider terminal 140, etc.). One or more components in the online to offline service system 100 may access the data or instructions stored in the storage 150 via the network 120. In some embodiments, the storage 150 may be directly connected to or communicate with one or more components in the online to offline service system 100 (e.g., the server 110, the service requester terminal 130, the service provider terminal 140, etc.). In some embodiments, the storage 150 may be part of the server 110.

In some embodiments, one or more components in the online to offline service system 100 (e.g., the server 110, the service requester terminal 130, the service provider terminal 140, etc.) may have a permission to access the storage 150. In some embodiments, one or more components in the online to offline service system 100 may read and/or modify information related to a service requester, a service provider, and/or the public when one or more conditions are met. For example, the server 110 may read and/or modify one or more users' information after a service. As another example, the service provider terminal 140 may access information related to the service requester when receiving a service request from the service requester terminal 130, but the service provider terminal 140 may not modify the relevant information of the service requester.

In some embodiments, information exchanging of one or more components in the online to offline service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the online to offline service system 100 performs, the element may perform through electrical signals and/or electromagnetic signals. For example, when a service requester terminal 130 processes a task, such as initiating a request for a transportation service, the service requester terminal 130 may operate logic circuits in its processor to perform such task. When the service requester terminal 130 transmits out a service request to the server 110, a processor of the server 110 may generate electrical signals encoding the request. The processor of the server 110 may then transmit the electrical signals to an output port. If the service requester terminal 130 communicates with the server 110 via a wired network, the output port may be physically connected to a cable, which further transmit the electrical signal to an input port of the server 110. If the service requester terminal 130 communicates with the server 110 via a wireless network, the output port of the service requester terminal 130 may be one or more antennas, which convert the electrical signal to electromagnetic signal. Similarly, a service provider terminal 140 may process a task through operation of logic circuits in its processor, and receive an instruction and/or service request from the server 110 via electrical signal or electromagnet signals. Within an electronic device, such as the service requester terminal 130, the service provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
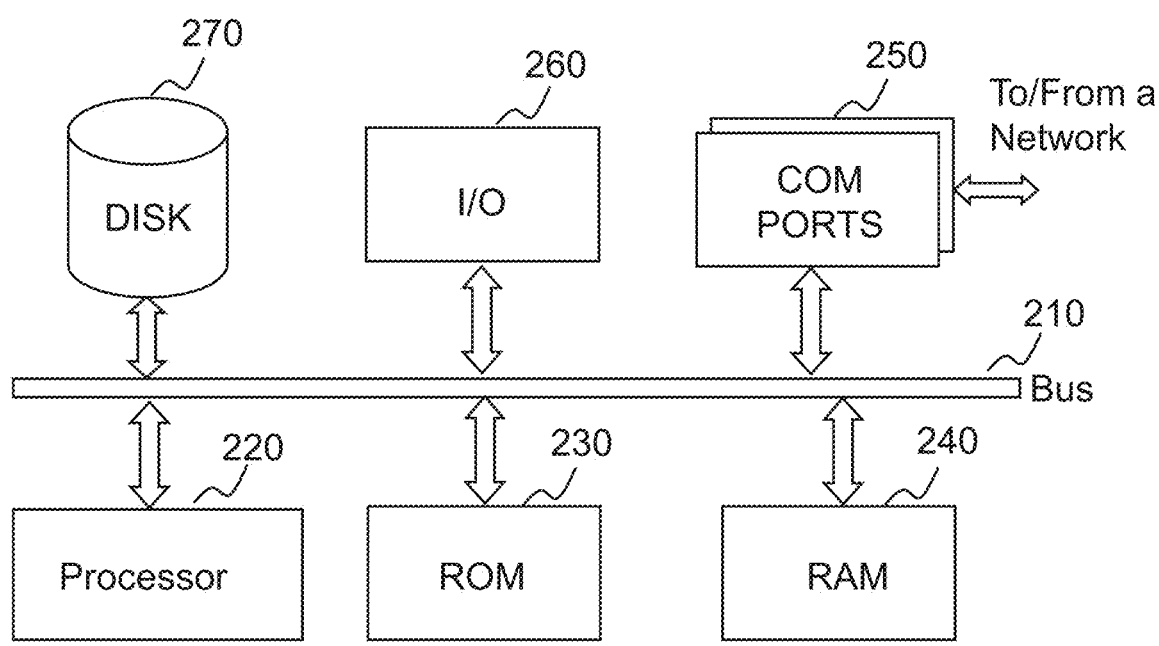
FIG. 2 is a schematic diagram illustrating exemplary hardware and/or software components of an exemplary computing device according to some embodiments of the present disclosure.

FIG. 2 is a schematic diagram illustrating exemplary hardware and software components of a computing device on which the server 110, the service requester terminal 130, and/or the service provider terminal 140 may be implemented according to some embodiments of the present disclosure. For example, the processing engine 112 may be implemented on the computing device 200 and configured to perform functions of the processing engine 112 disclosed in the present disclosure.

The computing device 200 may be used to implement an online to offline system for the present disclosure. The computing device 200 may implement any component of the online to offline service as described herein. In FIG. 2, only one such computer device is shown purely for convenience purposes. One of ordinary skill in the art would understood at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processor 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computer and other components therein. The computing device 200 may also receive programming and data via network communications.

Merely for illustration, only one processor 220 is described in the computing device 200. However, it should be noted that the computing device 200 in the present disclosure may also include multiple processors, thus operations and/or method steps that are performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
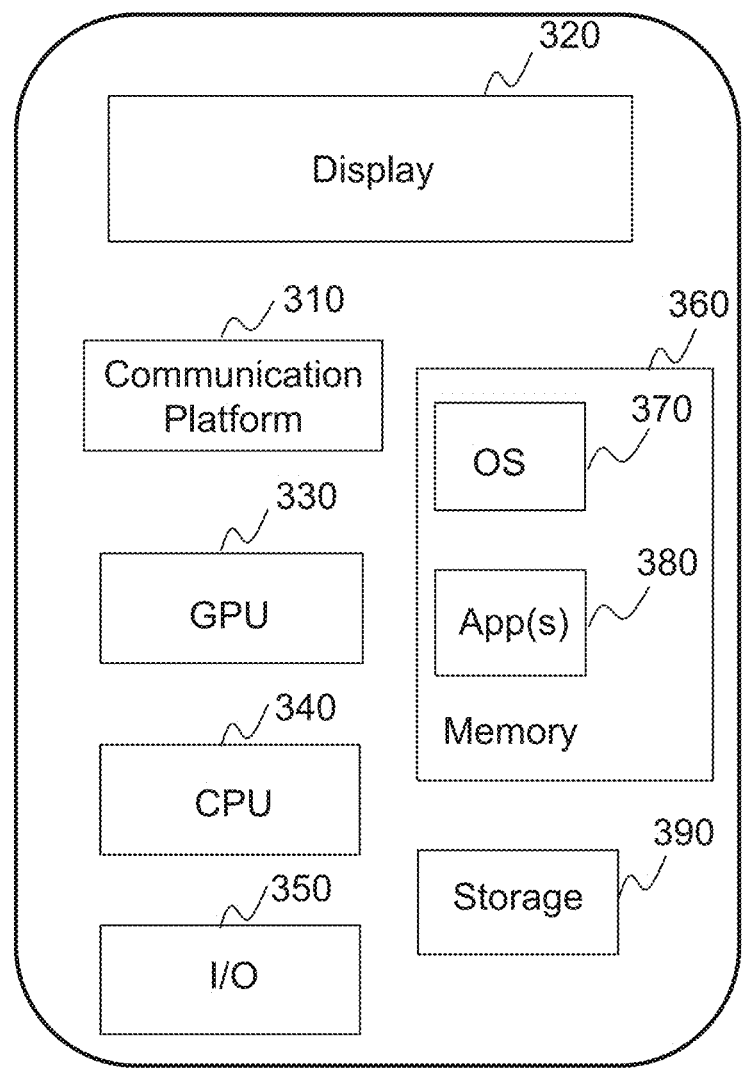
FIG. 3 is a schematic diagram illustrating an exemplary device according to some embodiments of the present disclosure.

FIG. 3 is a schematic diagram illustrating exemplary hardware and/or software components of an exemplary device on which the service requester terminal 130 and/or the service provider terminal 140 may be implemented according to some embodiments of the present disclosure. The device may be a mobile device, such as a mobile phone of a passenger or a driver. The device may also be an electronic device mounted on a vehicle driving by the driver. As illustrated in FIG. 3, the device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to an online to offline service or other information from the server 110, and transmitting information relating to an online to offline service or other information to the server 110. User interactions with the information stream may be achieved via the I/O 350 and provided to the server 110 and/or other components of the online to offline service system 100 via the network 120. In some embodiments, the device 300 may include a device for capturing speech information, such as a microphone 315.

Figure 4A:
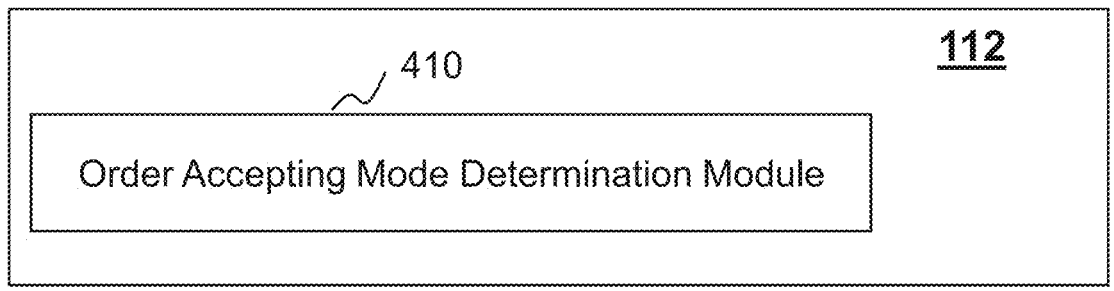
FIG. 4A is a block diagram illustrating an exemplary processing engine in a server according to some embodiments of the present disclosure.

FIG. 4A is a block diagram illustrating an exemplary processing engine in a server according to some embodiments of the present disclosure.

In some embodiments, the server 110 may include a memory, a processor (e.g., the processing engine 112), and a computer program stored in the memory and executed by the processor. When executing the computer program, the processor may perform any one of operations in a process for determining an order accepting mode for an online taxi-hailing service. In some embodiments, the processing engine 112 may include an order accepting mode determination module 410 as shown in FIG. 4A. The order accepting mode determination module 410 may implement any one of operations in processes described in FIG. 5A and FIGS. 6 through 10B.

Figure 4B:
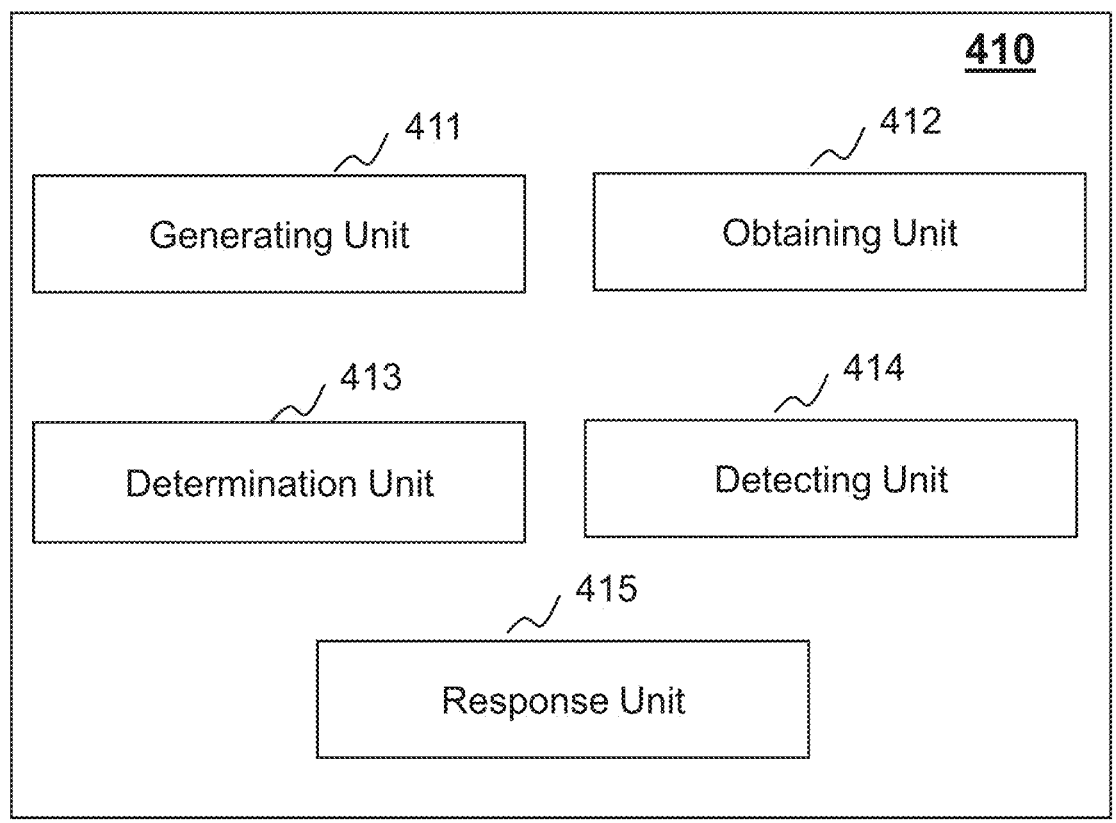
FIG. 4B is a block diagram illustrating an exemplary order accepting mode determination module in a server according to some embodiments of the present disclosure.

FIG. 4B is a block diagram illustrating an exemplary order accepting mode determination module in the server 110 according to some embodiments of the present disclosure.

In some embodiments, the order accepting mode determination module 410 may include a generating unit 411. The generating unit 411 may generate an order accepting mode according to one or more order accepting evaluation parameters of a driver terminal (also referred to herein as a service provider terminal) in response to a request for determining the order accepting mode (also referred to herein as an order accepting mode determination request). The order accepting mode may include an order designating mode, an order striving mode, or an order quick-accepting mode.

In the present disclosure, after the order accepting mode determination request is received, the order accepting evaluation parameters of the driver terminal may be obtained according to the order accepting mode determination request. Then the order accepting mode may be determined based on the order accepting evaluation parameters. The order accepting mode may also be fed back to the driver terminal and displayed on an interface of the driver terminal. Therefore, the determination of the order accepting mode based on the order accepting evaluation parameters is more in line with actual needs and meets needs of different operating drivers, thereby improving the operation efficiency. The integration of functions of the online to offline service platform may also be realized.

In some embodiments, the order accepting mode determination module 410 may include an obtaining unit 412. The obtaining unit 412 may obtain a historical driving score of a driver, for example, when the order accepting mode determination request is a request for logging in the online to offline service system. In some embodiments, the generating unit 411 may also generate an order quick-accepting mode when detecting that the historical driving score is smaller than a first threshold. The generating unit 411 may also generate an order designating mode when detecting that the historical driving score is larger than or equal to the first threshold and the historical driving score is smaller than or equal to a second threshold. In some embodiments, the generating unit 411 may also generate an order striving mode when detecting that the historical driving score is larger than the second threshold. The second threshold is larger than the first threshold.

In some embodiments, the order accepting mode determination module 410 may include a determination unit 413. The determination unit 413 may determine the historical driving score according to historical service data, the historical order completion rate, and the predetermined evaluation model relating to the driver terminal.

In some embodiments, the server 110 may include a database for storing historical scores of drivers. The server 110 may also update the database when a driver completes an order for each time.

In some embodiments, the determination unit 413 may also determine a transport capacity of a geographical region in which drivers is located based on location information of the drivers. In some embodiments, the generating unit 411 may also generate an order striving mode when there is available transport capacity in the geographical region and the available transport capacity is larger than a capacity threshold. In some embodiments, when the available transport capacity is larger than a capacity threshold, the generating unit 411 may also generate an order designating mode. In some embodiments, when detecting there is extra orders and the number of the extra orders is smaller than an order threshold, the generating unit 411 may generate the order designating mode. In some embodiments, when the number of the extra orders is larger than or equal to the order threshold, the generating unit 411 may generate the order quick-accepting mode.

In some embodiments, the order accepting mode determination request may include a request for switching the order accepting mode (also referred to herein as mode switching request) transmitted from a driver terminal of a driver. The determination unit 431 may also determine whether to respond the mode switching request based on the transport capacity and/or the historical driving score associated with the driver.

In some embodiments, the order accepting mode determination module 410 may include a detecting unit 414. The detecting unit 414 may detect whether there is an available transport capacity in a geographical region, for example, when the mode switching request is a request for switching the order accepting mode from the order designating mode to the order striving mode. The detecting unit 414 may also detect whether a historical driving score is larger than or equal to a predetermined threshold.

In some embodiments, the order accepting mode determination module 410 may also include a response unit 415. The response unit 415 may respond the mode switching request for switching the order accepting mode from the order designating mode to the order striving mode when the detecting unit 414 detects that there is an available transport capacity and/or the historical driving score is larger than or equal to the predetermined threshold.

Figure 4C:
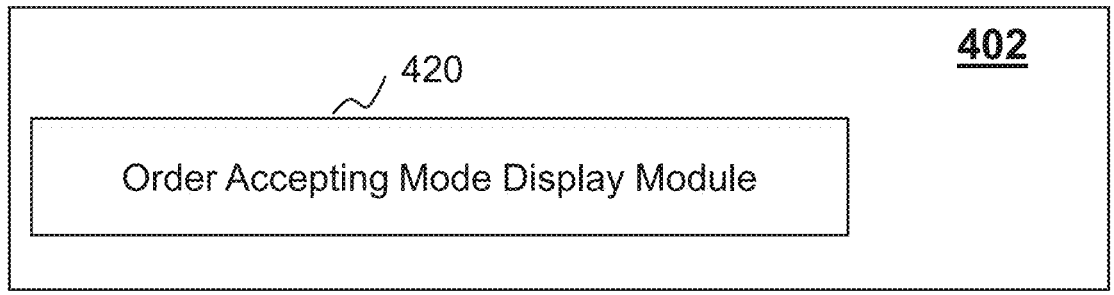
FIG. 4C is a block diagram illustrating an exemplary processor in a service provider terminal according to some embodiments of the present disclosure.

FIG. 4C is a block diagram illustrating an exemplary processor in a service provider terminal (e.g., a driver terminal) according to some embodiments of the present disclosure.

The driver terminal 402 may include a memory, a processor, and a computer program stored in the memory and executed by the processor. When executing the computer program, the processor may perform any one of operations in a process for displaying an order accepting mode for an online taxi-hailing service. In some embodiments, the processor in the driver terminal 402 may include an order accepting mode display module 420 as shown in FIG. 4C. The order accepting mode display module 420 may perform any one of operations in processes described in FIG. 5B.

Figure 4D:
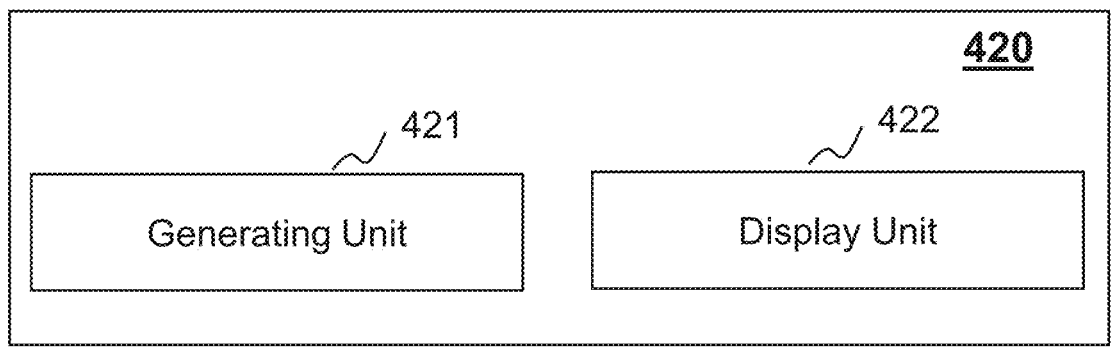
FIG. 4D is a block diagram illustrating an exemplary order accepting mode display module in a service provider terminal according to some embodiments of the present disclosure.

FIG. 4D is a block diagram illustrating an exemplary order accepting mode display module in a service provider terminal according to some embodiments of the present disclosure. The exemplary order accepting mode display module 420 in the service provider terminal (e.g., the driver terminal) may include a generating unit 421. The generating unit 421 may generate an initial order accepting interface corresponding to each of the order accepting mode, including the order designating mode, the order quick-accepting mode, or the order striving mode.

In some embodiments, the order accepting mode display module 420 may also include a display unit 422. The display unit 422 may display time information relating to an order in a first region of the initial order accepting interface when the order accepting mode is the order designating mode. The display unit 422 may also display distance information relating to an order in the first region of an initial order accepting interface when the order accepting mode is the order quick-accepting mode or the order striving mode.

In some embodiments, the display unit 422 may also display an order accepting identifier in a display region of the initial order accepting interface when the order accepting mode is the order designating mode. The display unit 422 may also display an order striving identifier in the second region of the initial order accepting interface when the order accepting mode is the order striving.

Figure 4E:
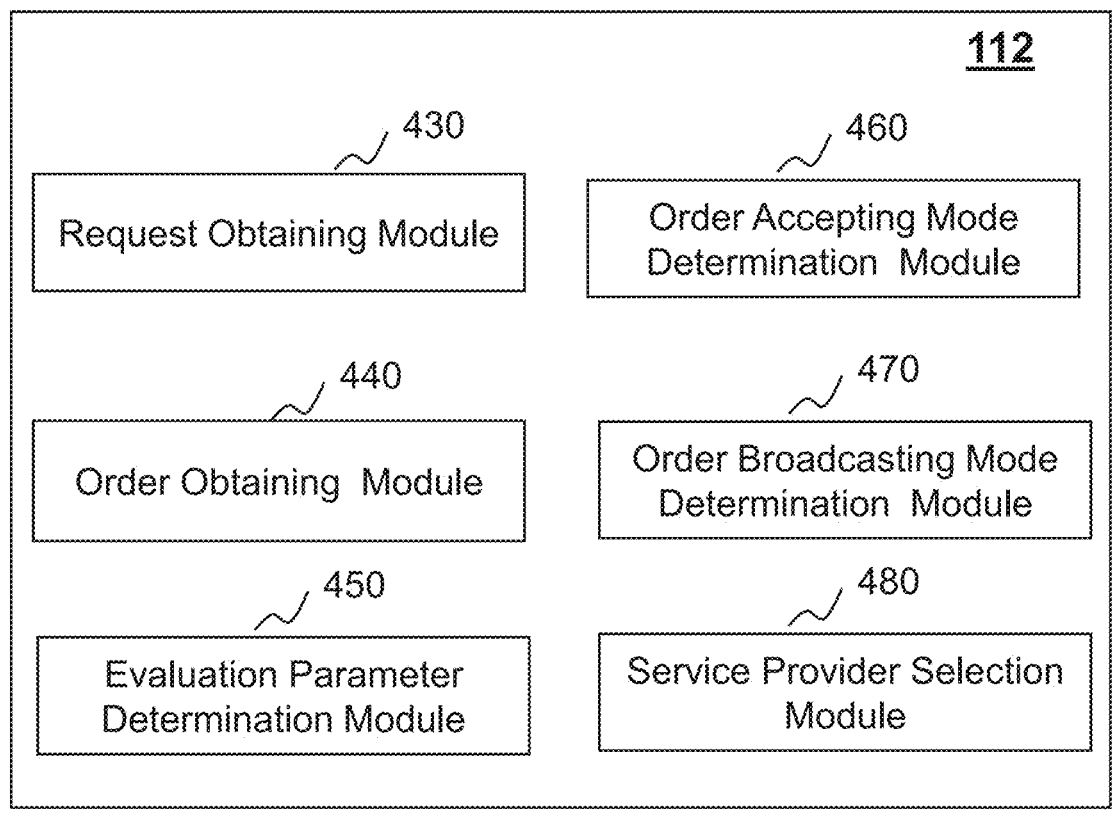
FIG. 4E is a block diagram illustrating an exemplary processing engine in a server according to some embodiments of the present disclosure.

FIG. 4E is a block diagram illustrating an exemplary processing engine in a server according to some embodiments of the present disclosure. The exemplary processing engine 112 may include a request obtaining module 430, the order obtaining module 440, the evaluation parameter determination module 450, the order accepting mode determination module 460, the order broadcasting mode determination module 470, the service provider selection module 480. Each module may be a hardware circuit that is designed to perform the following actions, a set of instructions stored in one or more storage media, and/or any combination of the hardware circuit and the one or more storage media. The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

The request obtaining module 430 may communicate with the service requester terminal 130 and/or the service provider terminal 140. For example, the request obtaining module 430 may receive a mode determination request and/or a mode switching mode from the service provider terminal 140.

The order obtaining module 440 may obtain an order from the service requester terminal 130. The order may be a real-time order or a reserved order.

The evaluation parameter determination module 450 may determine one or more order accepting evaluation parameters. The order accepting evaluation parameters may include a historical driving score relating to each of service providers, a transport capacity relating to geographical region in each time period, or the like, or any combination thereof. The transport capacity in a geographical region may relate to the number of available service providers and the number of unprocessed orders.

Figure 4F:
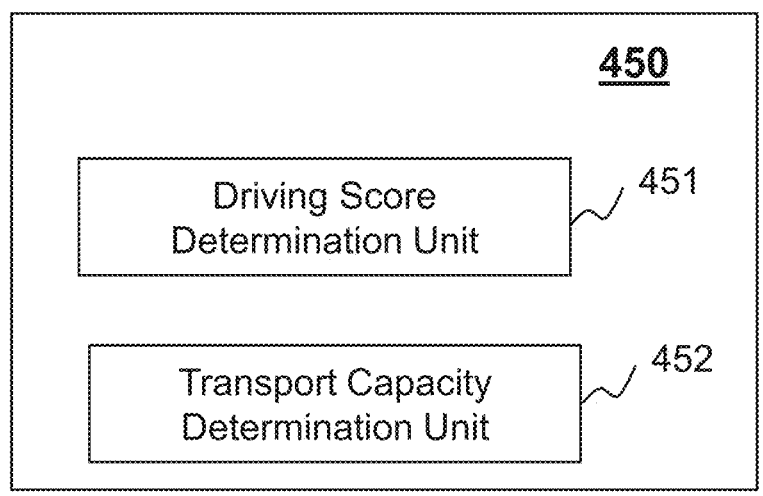
FIG. 4F is a block diagram illustrating an exemplary evaluation parameter determination module according to some embodiments of the present disclosure.

FIG. 4F is a block diagram illustrating an exemplary evaluation parameter determination module according to some embodiments of the present disclosure. The evaluation parameter determination module 450 may include a driving score determination unit 451 and a transport capacity determination unit 452. The driving score determination unit 451 may determine a historical driving score of a service provider, for example, based on historical service data relating to the service provider, e.g., the total number of historical orders that the service provider has accepted, the total number of historical orders that the service provider has finished, the service quality of the service provider based on the service requesters' feedbacks, a historical order completion rate, a historical order accepting rate, a historical order rejecting rate, or the like, or any combination thereof. The transport capacity determination unit 452 may determine a transport capacity in a geographical region. In some embodiments, the transport capacity determination unit 452 may also obtain location information of the service provider terminals and determine the number of service providers located in a specific geographical region. In some embodiments, the transport capacity determination unit 452 may also determine the number of available service providers in the specific geographical region based on service status of the service providers. In some embodiments, the transport capacity determination unit 452 may also determine the number of unprocessed orders or the number of extra orders in a geographical region. The number of extra orders of a specific geographical region in a specific time period may refer to a difference between the unprocessed order with starting locations in the specific geographical region in the specific time period and the number of available service providers in the specific geographical region in the specific time period (or the number of available service providers that will be in the specific geographical region in the specific time period), The order accepting mode determination module 460 may determine order accepting modes for service providers. In some embodiments, the order accepting mode determination module 460 may also determine whether to respond to the mode switching request when the request obtaining module 430 receives a mode switching request.

Figure 4G:
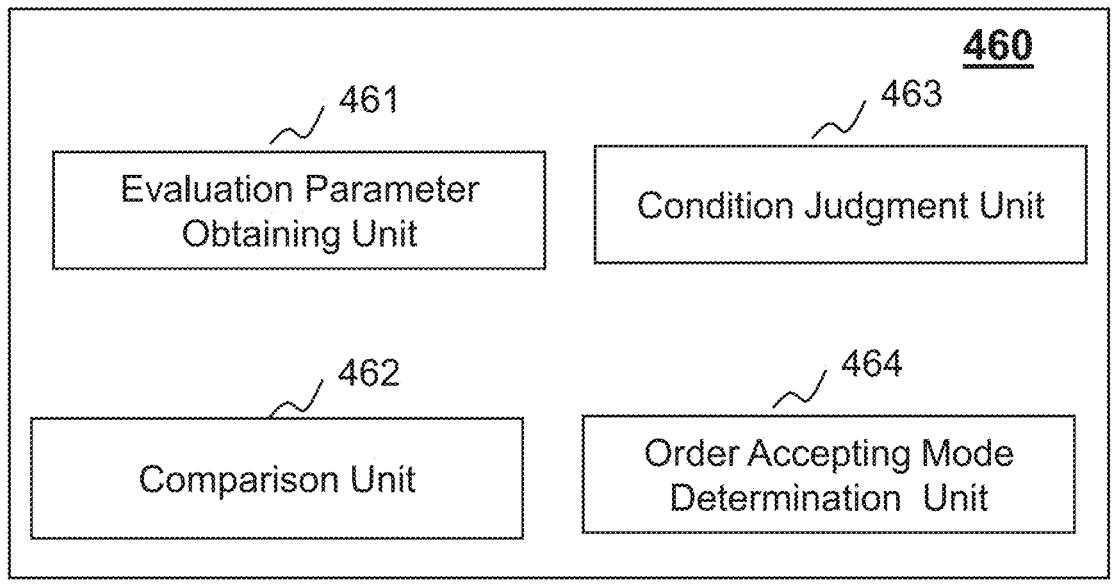
FIG. 4G is a block diagram illustrating an exemplary order accepting mode determination module according to some embodiments of the present disclosure.

FIG. 4G is a block diagram illustration an exemplary order accepting mode determination module in a server according to some embodiments of the present disclosure. In some embodiments, the order accepting mode determination module 460 may include an evaluation parameter obtaining unit 461, a comparison unit 462, a condition judgment unit 463, and an order accepting mode determination unit 464. The evaluation parameter obtaining unit 461 may obtain one or more order accepting evaluation parameters from the evaluation parameter determination module 450. For example, the evaluation parameter obtaining unit 461 may obtain a historical driving score of a service provider, from the driving score determination unit 451. As another example, the evaluation parameter obtaining unit 461 may obtain, from the transport capacity determination unit 452, a transport capacity of a geographical region. The transport capacity may include the number of available service providers in the geographical region, the number of unprocessed orders with starting locations in the geographical region.

The comparison unit 462 may compare one or more order accepting evaluation parameters (e.g., a historical driving score, the number of available service providers, the number of unprocessed orders, the difference between the number of available service providers and the number of unprocessed orders, etc.) with one or more thresholds. The condition judgment unit 463 may determine whether an accepting evaluation parameter is larger than, smaller than, or equal to a threshold.

The order accepting mode determination unit 464 may determine an order accepting mode for a service provider based on the result obtained from the condition judgment unit 463. For example, the order accepting mode determination unit 464 may determine an order accepting mode for a service provider when the request obtained by the request obtaining module 430 is a mode determination request. As another example, the order accepting mode determination unit 464 may switch the order accepting mode from an initial order accepting mode to a target order accepting mode when the request obtained by the request obtaining module 430 is a mode switching request.

The order broadcasting mode determination module 470 may determine an order broadcasting mode when the processing engine 112 receive an order. The order may be a real-time order or a reserved order. An order may be broadcasted in any one of three order broadcasting modes. Each of the three order broadcasting modes may corresponding to one of the three order accepting modes for service providers. For illustration purposes, an order broadcasting mode corresponding to the order striving mode may be referred to herein as a first broadcasting mode or an order striving-broadcasting mode; an order broadcasting mode corresponding to the order designating mode may be referred to herein as a second broadcasting mode or an order designating-broadcasting mode; and an order broadcasting mode corresponding to the order quick-accepting mode may be referred to herein as a third broadcasting mode, an order quick-broadcasting mode, or an order quick-allocating mode.

Figure 4H:
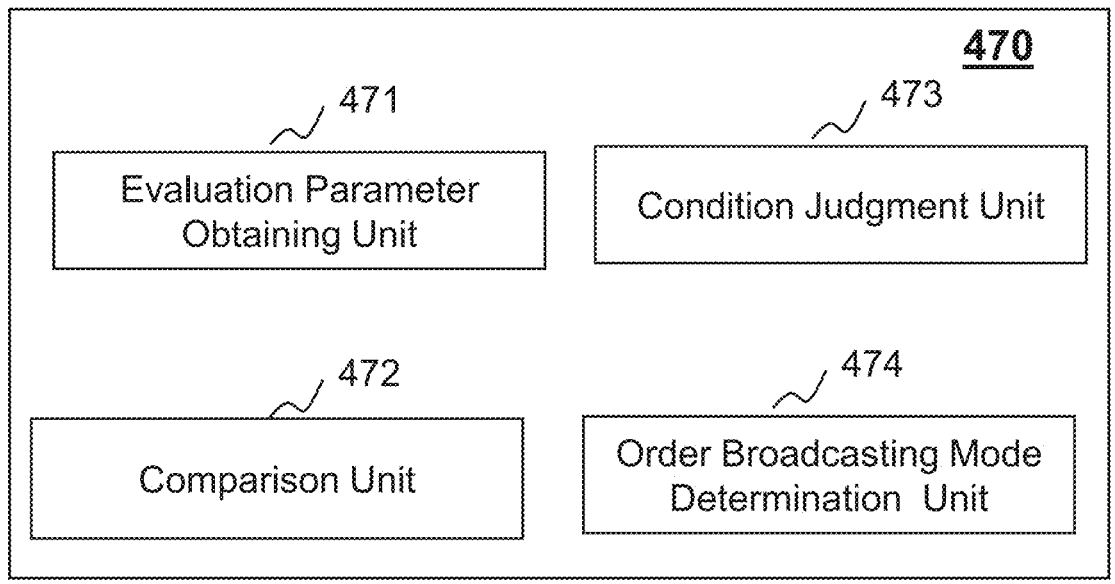
FIG. 4H is a block diagram illustrating an exemplary order broadcasting mode determination module according to some embodiments of the present disclosure.

FIG. 4H is a block diagram illustrating an exemplary order broadcasting mode determination module according to some embodiments of the present disclosure. In some embodiments, the order broadcasting mode determination module 470 may include an evaluation parameter obtaining unit 471, a comparison unit 472, a condition judgment unit 473, and an order broadcasting mode determination unit 474.

The evaluation parameter obtaining unit 471 may obtain one or more order accepting evaluation parameters from the evaluation parameter determination module 450. For example, the evaluation parameter obtaining unit 464 may obtain, e.g., from the transport capacity determination unit 452, a transport capacity of a geographical region, including the number of available service providers in the geographical region, the number of unprocessed orders with starting locations in the geographical region.

The comparison unit 462 may compare one or more evaluation parameters (e.g., the number of available service providers, the number of unprocessed orders, the difference between the number of available service providers and the number of unprocessed orders) with one or more thresholds. The condition judgment unit 473 may determine whether an evaluation parameter is larger than, smaller than, or equal to a threshold.

The order broadcasting mode determination unit 474 may determine an order accepting mode for an order based on the result obtained from the condition judgment unit 473.

In some embodiments, the processing engine 112 may further include a service provider selection module 480. The service provider selection module 480 may identify service providers, from a plurality of service providers, with a specific order accepting mode.

It should be noted that the above descriptions about the processing engine 112, and/or the order accepting mode determination module 410 or 460 are merely examples, and not intended to be limiting. In some embodiments, one or more units described in order accepting mode determination module 410 may correspond to one or more modules of the exemplary processing engine 112 shown in FIG. 4E, one or more units of the exemplary evaluation parameter determination module 450 shown in FIG. 4E, one or more units of the exemplary order accepting mode determination module 460 shown in FIG. 4G. For example, the generating unit 411 may correspond to the order accepting mode determination module 460 shown in FIG. 4E. As another example, the obtaining unit 412 may correspond to the request obtaining module 430 shown in FIG. 4E. As still another example, the determination unit 413 and the detecting unit 414 may correspond to the evaluation parameter determination module 450 (including the driving score determination unit 451, the transport capacity determination unit 452 shown in FIG. 4F), the comparison unit 462, and/or the condition judgment unit 463 shown in FIG. 4G. As yet another example, the response unit 415 may correspond to the order accepting mode determination unit 464 shown in FIG. 4G.

In some embodiments, any two of the units may be combined as a single unit. For example, the evaluation parameter 461 and the evaluation parameter 471 may be combined as a single unit. As another example, the comparison unit 462 and the comparison unit 472 may be combined as a single unit; the condition judgment unit 463 and the condition judgment unit 473 may be combined as a single unit. As still another example, the comparison unit 462, the comparison unit 472, the condition judgment unit 463, and the condition judgment unit 473 may be combined as a single unit.

In some embodiments, any one of the modules may be divided into two or more sub modules. For example, the order accepting mode determination module 460 may be divided into two sub modules. The first sub module of the two sub modules may respond an order accepting mode determination request to determine an order accepting mode for a service provider. The second sub module of the two sub modules may respond a mode switching request to switch an order accepting mode from an initial order accepting mode to a target order accepting mode.

Figure 5A:
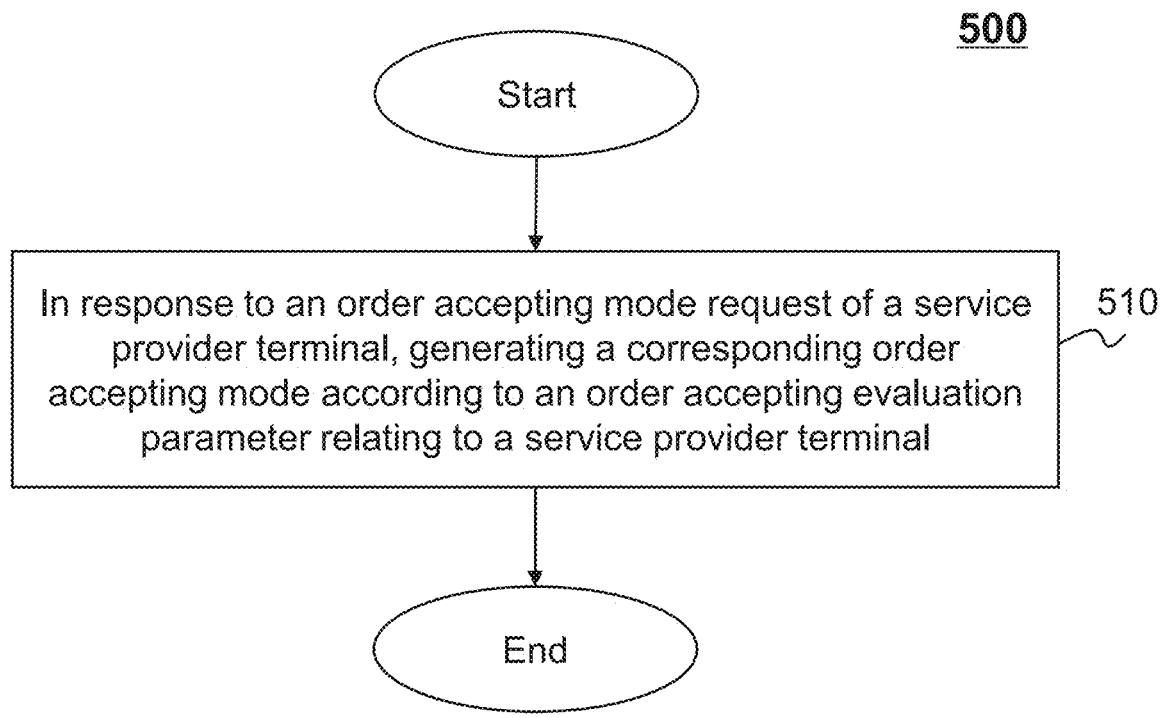
FIG. 5A is a flowchart illustrating an exemplary process for determining an order accepting mode for a target service provider according to some embodiments of the present disclosure.

FIG. 5A is a flowchart illustrating an exemplary process for determining an order accepting mode for a target service provider according to some embodiments of the present disclosure.

The process 500 for determining an order accepting mode for a target service provider of an online taxi-hailing service according to an embodiment of the present invention may be applicable to a server. As shown in FIG. 5A, the process 500 may include: in 510, in response to a mode determination request of a service provider terminal (e.g., a driver terminal), generating an instruction relating to a corresponding order accepting mode according to obtained order accepting evaluation parameters of the driver terminal, and feeding back instruction relating to the corresponding order accepting mode to the driver terminal. The order accepting mode may include an order designating mode, an order striving mode, or an order quick-accepting mode.

In the embodiment, after the mode determination request of the driver terminal is accepted, an order accepting evaluation parameter of the driver terminal may be obtained according to the mode determination request so as to generate the corresponding order accepting mode based on the order accepting evaluation parameter. Then, the order accepting mode may be fed back to the driver terminal and shown on an interface of the driver terminal to determine an order accepting mode for the driver terminal. In this way, on one hand, the order accepting mode is determined based on the order accepting evaluation parameter, so that the determination of the order accepting mode may be more in line with actual needs and may meet needs of different operating drivers, thereby improving the operating efficiency. On the other hand, the functional integration of an application platform of the driver terminal may be realized.

The order accepting evaluation parameter may include a real-time working condition parameter and a historical driving parameter. The real-time working condition parameter may characterize a current operating environment, including information relating to transport capacity, traffic information, order information, or the like. The historical driving parameter may characterize a driver grade determined according to the driving experience of the driver, including the number of accepted orders, the number of rejected orders, service quality, or the like, or any combination thereof.

In some embodiments, the order accepting evaluation parameter may further include the transport capacity of an operation region in which the driver terminal is currently located and/or a historical driving score of the driver terminal. The operation region may refer to an area in which the drivers qualified to accept orders of the online to offline service system are operated. The transport capacity may refer to the number of drivers with the qualification for accepting orders of the online to offline service system.

In some embodiments, the operation region relating to a driver terminal may refer to a geographical region around a location of the driver. The geographical region may be of any shape or size. For example, the geographical region may be a circular region with a two kilometer radius centered at the location of the driver terminal. The transport capacity of a geographical region in a specific time period may be the number of online drivers located in the geographical region in the specific time period that are qualified to accept orders.

In the present disclosure, three evaluation environments may be provided: (i) the order accepting evaluation parameter may be determined only based on the transport capacity of the operation region in which the driver terminal is currently located, which is effective; (ii) the order accepting evaluation parameter may be determined only based on the historical driving score of the driver terminal, which may be helpful to the operating efficiency and the operation quality of a driver; and (iii) the order accepting evaluation parameter may be determined based on the transport capacity and the historical driving score. In some embodiments, weight values may be designated to the transport capacity and the historical driving score, for example, according to the emphasis to the transport capacity or the historical driving score, thereby making the determination of the order accepting mode more reasonable.

In some embodiments, the generating the corresponding order accepting mode according to the obtained order accepting evaluation parameter of the driver terminal may include: obtaining the historical driving score when the mode determination request is a request for logging in the system (also referred to herein as a login request) from the driver terminal; generating an order quick-accepting mode when it is detected that the historical driving score is less than a first predetermined threshold; generating an order designating mode when it is detected that the historical driving score is greater than or equal to the first predetermined threshold and less than or equal to a second predetermined threshold; and generating an order striving mode when it is detected that the historical driving score is greater than the second predetermined threshold, in which the second predetermined threshold is greater than the first predetermined threshold.

In some embodiments, when the mode determination request is a login request of the driver terminal, the system may also obtain the historical driving score of the driver associated with the driver terminal and compare the historical driving score with a predetermined score threshold interval. For example, the first predetermined threshold and the second predetermined threshold may be taken as dividing points so as to divide a range into a first threshold interval, a second threshold interval, and a third threshold interval. The order designating mode may be generated when it is detected that the historical driving score is less than the first predetermined threshold, that is when the historical driving score belongs to the first threshold interval; the order quick-accepting mode may be generated when it is detected that the historical driving score is greater than or equal to the first predetermined threshold and less than or equal to the second predetermined threshold, that is when historical driving score belongs to the second threshold interval; and the order striving mode may be generated when it is detected that the historical driving score is greater than the second predetermined threshold, that is when historical driving score belongs to the third threshold interval, so that a function of determining the order accepting mode by using the historical driving score as the order accepting evaluation parameter may be realized.

Figure 7:
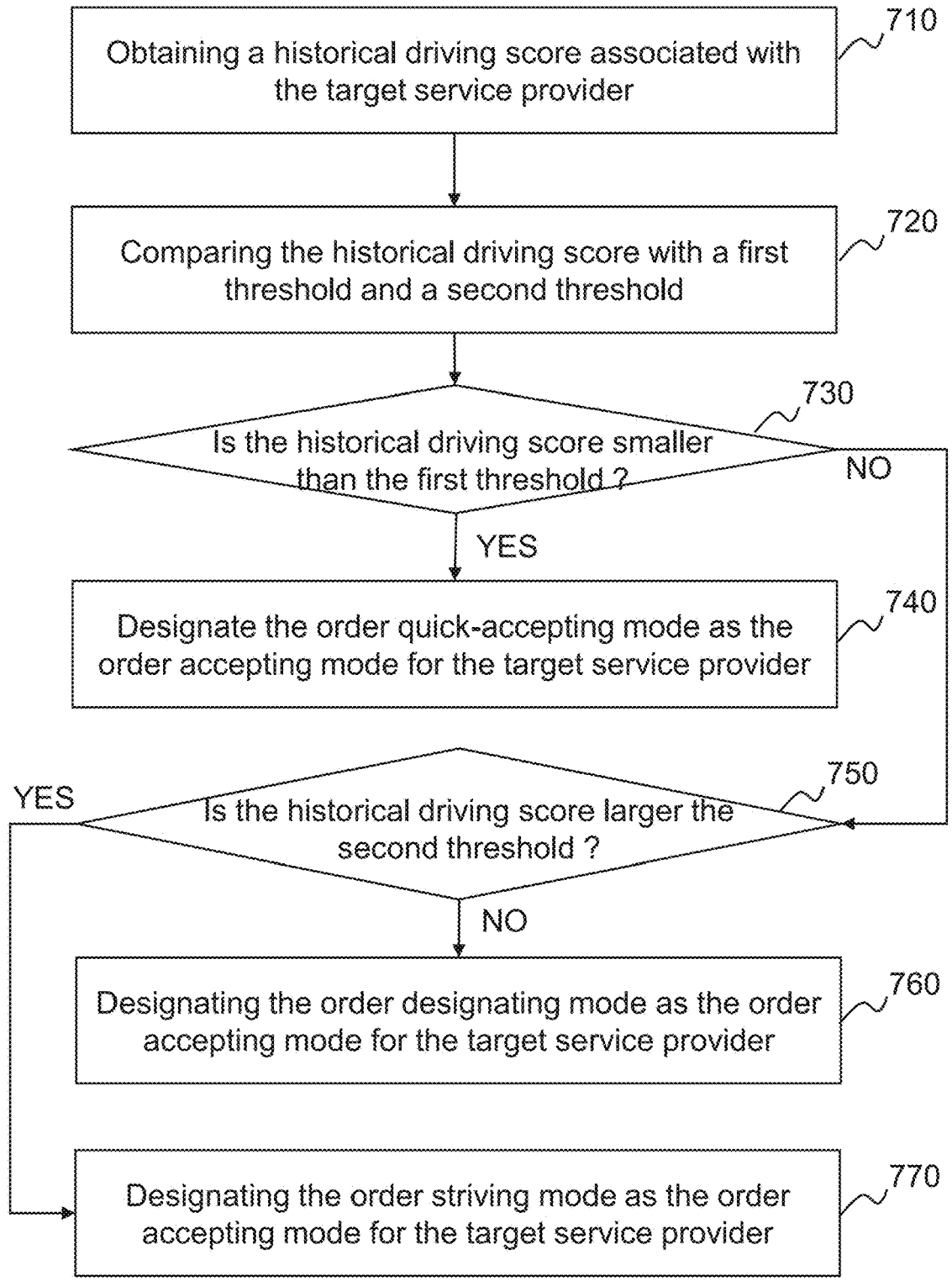
FIG. 7 is a flowchart illustrating an exemplary process for determining an order accepting mode for a target service provider based on a historical driving score of the target service provider according to some embodiments of the present disclosure.

Detailed descriptions about the determination the order accepting mode for a driver based on the historical driving score of the driver may be found in FIG. 7 and the relevant descriptions.

The order quick-accepting mode, the order designating mode, and the order striving mode may be ranked from a low priority to a high priority, i.e., from a passive mode to an active mode. Specifically, a driver may have no right to select or reject an order in the order quick-accepting mode, a driver may have the right to reject an order in the order designating mode, and a driver may have relatively high autonomy in the order striving mode, for example, the driver may select an order he wants to accept by striving for the order. Specifically, when a driver logs in the system, an order accepting mode after login may need to be determined. At that time, the request for logging in the system may be the request for determining the order accepting mode for the driver, and the order accepting mode may be automatically matched after login, which may be helpful to the integrated use of the driver terminal.

In some embodiments, when the mode determination request is the login request of the driver terminal, before obtaining the historical driving score, the process 500 may also include determining the historical driving score according to historical service data, a historical order completion rate, and/or a predetermined evaluation model.

In some embodiments, the historical driving score may be determined according to the historical service data, the historical order completion rate, and the predetermined evaluation model relating to the driver terminal, so that the historical driving score may be determined and taken as the order accepting evaluation parameter.

In some embodiments, the predetermined evaluation model may include corresponding weight values for the historical service data and the historical order completion rate in a simple model structure.

In some embodiments, the server may include a score database to store one or more scores relating to one or more drivers. The scores in the score database may be updated after each time a driver completes an order.

In some embodiments, the generating the order accepting mode according to the obtained order accepting evaluation parameter of the driver terminal may include: when the login request of the driver terminal is received, determining the transport capacity of an operation region in which the driver terminal is currently located according to the obtained location information of the driver terminal; generating the order striving mode when an available transport capacity is detected in the operation region and the available transport capacity is greater than or equal to a predetermined transport capacity threshold; generating the order designating mode when it is detected that the available transport capacity is less than the predetermined transport capacity threshold, or extra orders are detected and the number of the extra orders is less than a predetermined order threshold; and generating the order quick-accepting mode when it is detected that the number of the extra orders is greater than or equal to the predetermined order threshold.

The available transport capacity of a geographical region may refer to the available drivers in the geographical region. The available transport capacity may also refer to the available drivers or available service providers. The extra orders in a geographical region may refer to the orders that have not been processed (e.g., not been allocated) with starting locations falling in the geographical region. In some embodiments, the number of extra orders may be equal to the number of unprocessed orders. Yet in some other embodiments, the number of extra orders may refer to a difference between the number of unprocessed order and the number of available drivers.

Detailed description about the determination of the order accepting mode with respect to a target driver may be found in FIGS. 8A through 8D and relevant descriptions thereof.

In some embodiments, when the login request of the driver terminal is received, the location information of the driver terminal may be obtained by a positioning device of the driver terminal so as to determine the operation region in which the driver terminal is currently located according to the location information of the driver terminal and further determine the transport capacity of the operation region. When an available transport capacity is detected and the available transport capacity is greater than or equal to the predetermined transport capacity threshold, the order striving mode may be generated; when it is detected that the available transport capacity is less than the predetermined transport capacity threshold, or extra orders are detected and the number of the extra orders is less than the predetermined order threshold, the order designating mode may be generated; and when it is detected that the number of the extra orders is greater than or equal to the predetermined order threshold, the order quick-accepting mode may be generated. The way to determine the order accepting mode based on the transport capacity of the operation region may be helpful to the rational distribution of the transport capacity, and may also be conductive to the improvement of the order accepting efficiency of drivers.

In some embodiments, reserved orders may also be conducted in the order accepting modes described above.

Specifically, when quite a number of available drivers are detected, i.e., when the number of drivers is greater than that of users (i.e., passengers), the order striving mode may be set. Therefore, on one hand, the fairness of accepting orders may be improved by the driver actively controlling the acceptance of orders, on the other hand, the users (e.g., drivers, passengers) may also be reminded about the surplus capacities in the current region. When it is detected that the number of users (i.e., passengers) is greater than the number of drivers, the order quick-accepting mode may be set, in which case the efficiency is higher compared with the order striving mode or the order designating mode. When it is detected that the number of drivers are equal to the number of orders, the order allocation mode may be set so as to balance the drivers and the orders.

In some embodiments, for third-tier cities, due to the limited number of drivers, the server may directly determine the order quick-accepting mode as the order accepting mode for drivers in the third-tier cities when the drivers log in the system. In this case, when order information is received at the background of the system, the system may identify at least one driver with the order quick-accepting mode and directly allocate the order according to a distance range between the driver and a pick-up point of a passenger relating to the order.

In addition, when a driver logs in the system, an order accepting mode after login may need to be determined. At this time, the login request of the driver terminal may be treated as the request for determining the order accepting mode, and the order accepting mode may be automatically matched after login, which may be conductive to the integrated use of functions of the driver terminal.

In some embodiments, the determining the order accepting mode according to the obtained order accepting evaluation parameter of the driver terminal may include: when the mode determination request is an order accepting mode switching request transmitted from the driver terminal, determining whether to respond the order accepting mode switching request according to the transport capacity and/or the historical driving score.

In some embodiments, when the received mode determination request is an order accepting mode switching request, it may be determined whether to perform the switching operation according to the transport capacity and/or the historical driving score. Therefore, on one hand, the order accepting mode may be switched when a switching condition is satisfied, on the other hand, determining whether to respond the switching request according to the operating capacity and/or the historical driving score may be conductive to the capacity balance, thereby improving service quality of the driver terminal.

In some embodiments, when the mode determination request is the order accepting mode switching request transmitted by the driver terminal, determining whether to respond the order accepting mode switching request according to the transport capacity and/or the historical driving score may include: when the order accepting mode switching request is to switch from the order designating mode to the order striving mode, detecting whether there is an available transport capacity in the operation region and/or detecting whether the historical driving score is greater than or equal to a predetermined evaluation threshold; when it is detected that there is an available transport capacity in the operation region and/or the historical driving score is greater than or equal to the predetermined evaluation threshold, responding the order accepting mode switching request so as to switch from the order designating mode to the order striving mode.

In some embodiments, when the order accepting mode switching request is to switch from the order designating mode to the order striving mode, through detecting whether there is an available transport capacity in the operation region and/or whether the historical driving score is greater than or equal to the predetermined evaluation threshold, the switching operation may be performed when it is detected that there is an available transport capacity in the operating capacity and/or the historical driving score is greater than or equal to the predetermined evaluation threshold. The purpose of detecting whether there is an available transport capacity is to detect the operating condition and determine whether there is a need to switch to the order striving mode. The purpose of detecting whether the historical driving score is greater than or equal to the predetermined evaluation threshold is to determine whether the driver is qualified for the switching request.

In some embodiments, when the order accepting mode is the order designating mode, the server may transmit an order accepting instruction to a specific driver terminal, and detect whether confirmation information fed back by the specific driver terminal is received within a predetermined time period, so as to confirm whether the order has been accepted. When the order accepting mode is the order striving mode, the server may transmit an order striving instruction to a plurality of driver terminals, and determine a driver terminal from the plurality of driver terminals that accepts the order according to the response status of the plurality of driver terminals. When the order accepting mode is the order quick-accepting mode, the server may transmit an order to a specific driver terminal directly.

Figure 5B:
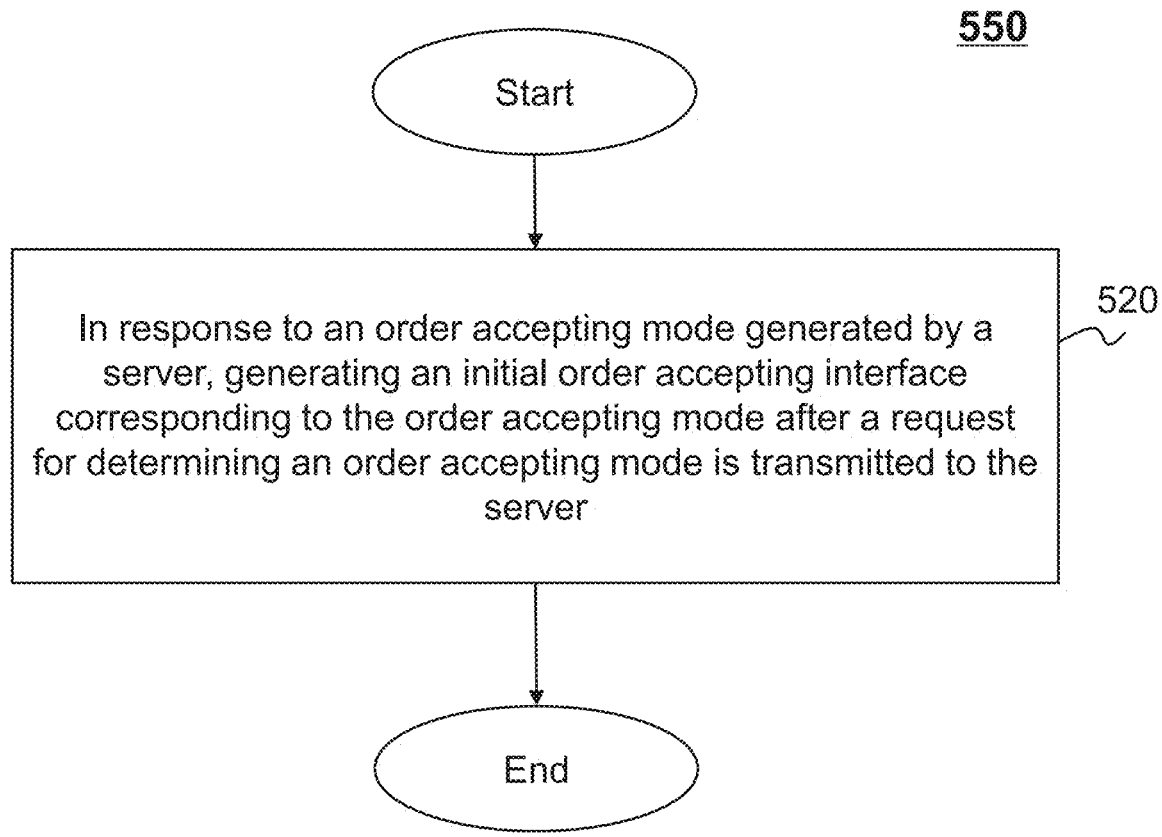
FIG. 5B is a flowchart illustrating an exemplary process for generating an initial order accepting interface in a service provider terminal according to some embodiments of the present disclosure.

FIG. 5B is a flowchart illustrating an exemplary process for generating an initial order accepting interface in a service provider terminal according to some embodiments of the present disclosure.

The process 550 for determining generating an initial order accepting interface may be applicable to a driver terminal. As shown in FIG. 5B, the process 550 may include: in 520, in response to an order accepting mode generated by the server, generating an initial order accepting interface corresponding to the order accepting mode after a mode determination request is transmitted to the server. The order accepting mode may include the order designating mode, the order striving mode, and the order quick-accepting mode.

In some embodiments, after the mode determination request is transmitted to the server by the driver terminal, the order accepting evaluation parameter relating to the driver terminal may be obtained according to the mode determination request so as to generate the corresponding order accepting mode based on the order accepting evaluation parameter. Then, the order accepting mode may be fed back to the driver terminal and shown on an interface of the driver terminal to determine an order accepting mode for the driver terminal. In this way, on one hand, the order accepting mode is determined based on the order accepting evaluation parameter, so that the determination of the order accepting mode may be more in line with actual needs and may meet needs of different drivers, thereby improving the operating efficiency. On the other hand, the integration of functions of the driver terminal application platform may be realized.

In some embodiments, the mode determination request may be a login request of the driver terminal, or an order accepting mode switching request transmitted from the driver terminal after login.

In some embodiments, the generating the initial order accepting interface corresponding to the order accepting mode may include: displaying time information of an order in a first region (also referred to as a first display region) when the order accepting mode is an order designating mode, and displaying distance information relating to an order in the first region when the order accepting mode is an order striving mode or an order quick-accepting mode.

The way to display the time information of an order in the first region when the order accepting mode is the order designating mode, and display the order distance information in the first region when the order accepting mode is the order striving mode or the order quick-accepting mode may direct the driver to pay more attention to the time of picking up the customer when the time information of the order is displayed for the order designate mode. For the order striving mode and the order quick-accepting mode, especially in the order striving mode, due to the character of real-time, by displaying the distance information of an order in the first region, a reference may be provided for the user on whether to strive for the order.

In some embodiments, the generating the initial order accepting interface corresponding to the order accepting mode may further include: displaying an order accepting identifier in a second region (also referred to as a second display region) when the order accepting mode is the order designating mode, and displaying an order striving identifier in the second region when the order accepting mode is the order striving mode.

The way to display the order accepting identifier in the second region when the order accepting mode is the order designating mode, and the order striving identifier in the second region when the order accepting mode is the order striving mode may reminder the user (e,g., the driver) to accept, reject, or strive for an order, thereby improving the user experience.

Figure 6:
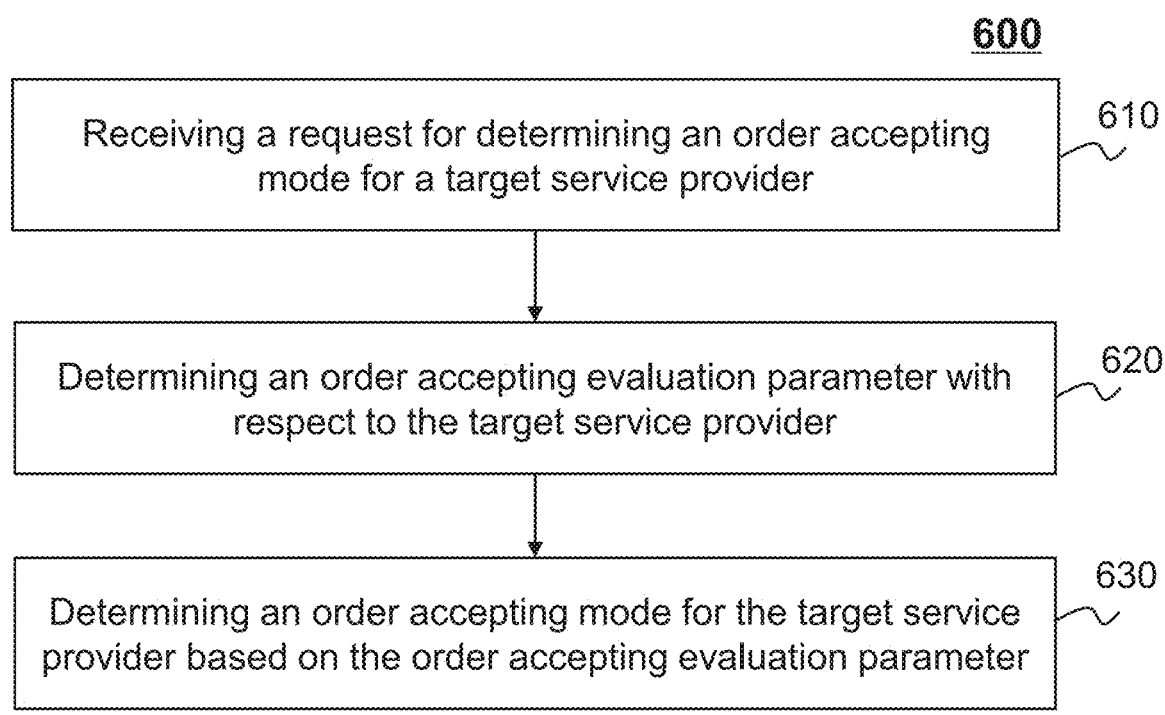
FIG. 6 is a flowchart illustrating an exemplary process for determining an order accepting mode for a target service provider according to some embodiments of the present disclosure.

FIG. 6 is a flowchart illustrating an exemplary process for determining an order accepting mode for a target service provider according to some embodiments of the present disclosure. In some embodiments, the process 600 may be implemented in the online to offline service system 100 as illustrated in FIG. 1. For example, the process 600 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the processing engine 112 (e.g., the request obtaining module 430) may receive a request for determining an order accepting mode (also referred to herein as a mode determination request) for a target service provider. In some embodiments, the mode determination request may be initiated by the target service provider through a user terminal (e.g., the service provider terminal 140) associated with the target service provider. For example, when the target service provider initiates a request for logging in the online to offline service system 110 (also referred to herein as a login request), the processing engine 112 may obtain the login request and determine the order accepting mode for the target service provider immediately. In this case, the login request may be treated as the mode determination request. In some embodiments, the mode determination request may be determined by the processing engine 112. The processing engine 112 may detect whether to determine an order accepting mode for the target service provider. For example, when the target service provider logs in the online to offline service system 100, the processing engine 112 may instruct the target service provider to select an order accepting mode and transmit the selected order accepting mode to be displayed on the user interface of the service provider terminal 140 associated with the target service provider. As another example, upon detecting that the target service provider logs in the online to offline service system 100, the processing engine 112 may instruct the target service provider to transmit an inquiry to be displayed on the user interface of the service provider terminal 140 as to whether there is a need to determine an order accepting mode. If determining an order accepting mode is desired by the target service provider, i.e., the target service provider initiates a mode determination request or confirms a mode determination inquiry, the processing engine 112 may determine an order accepting mode for the target service provider. As another example, when the target service provider logs in the online to offline service system 100 and has no further actions such as selecting an order accepting mode in a predetermined time period, the processing engine 112 may automatically determine that the target service provider initiates a request for determining an order accepting mode.

When the processing engine 112 receives the request, the processing engine 112 (e.g., the evaluation parameter determination module 112) may determine an order accepting evaluation parameter with respect to the target service provider in 620. In some embodiments, the order accepting evaluation parameter may include a historical driving score associated with the target service provider, a transport capacity of a geographical region in which the target service provider terminal 140 associated with the target service provider may be located. The geographical region may be of any shape or size. For a real-time order, the transport capacity may relate to the current time. For a reserved order, the transport capacity may relate to a starting time of the reserved order.

In 630, the processing engine 630 (e.g., the order accepting mode determination module 460) may determine an order accepting mode for the target service provider based on the order accepting evaluation parameter. In some embodiments, the processing engine 112 may determine the order accepting mode only based on the historical driving score associated with the target service provider. In some embodiments, the processing engine 112 may determine the order accepting mode only based on the transport capacity of the geographical region in which the target service provider terminal 140 associated with the target service provider may be located. In some embodiments, the processing engine 112 may determine the order accepting mode based on both the historical driving score and the transport capacity.

In some embodiments, the processing engine 112 may determine a same order accepting mode for all service providers in a same operation region (e.g., a city). For example, during a traffic peak time of a small city, the number of orders to be allocated may be much greater than the number of available service providers. To efficiently serve the service requesters in the small city, the processing engine 112 may designate the order quick-accepting mode for all of the service providers in the city.

In some embodiments, when the order accepting mode is determined, the processing engine 112 may send a notice to the target service provider requesting the service provider to confirm the determined order accepting mode. The notice may be sent via the network 120 and displayed on the service provider terminal 140 in a form of text, image, audio, video, etc. In some embodiments, the processing engine 112 may assign the determined order accepting mode to the target service provider without requesting a confirmation.

FIG. 7 is a flowchart illustrating an exemplary process for determining an order accepting mode for a target service provider based on a historical driving score of the target service provider according to some embodiments of the present disclosure. In some embodiments, the process 700 may be implemented in the online to offline service system 100 as illustrated in FIG. 1. For example, the process 700 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7A and described below is not intended to be limiting. In some embodiments, operation 620 of the process 600 may be performed according to the process 700.

In 710, the processing engines 112 (e.g., the evaluation parameter obtaining unit 461) may obtain a historical driving score associated with the target service provider from the evaluation parameter determination module 450, e.g., the driving score determination unit 451 In some embodiments, the driving score determination unit 451 may determine the historical driving score based on historical service data relating to the target service provider, e.g., the total number of historical orders that the target service provider has accepted, the total number of historical orders that the target service provider has finished, the service quality of the target service provider based on the service requesters' feedbacks, a historical order completion rate, a historical order accepting rate, a historical order rejecting rate, or the like, or any combination thereof. The historical order completion rate may be a ratio between the total number of historical orders that the target service provider has finished and the total number of historical orders that the target service provider has accepted. In some embodiments, the driving score determination unit 451 may use a predetermined evaluation model based on the historical service data (e.g., the historical order completion rate) of the target service provider to determine the historical driving score associated with the target service provider.

In 720, the processing engine 112 (e.g., the comparison unit 462) may compare the historical driving score with a first threshold and a second threshold. The second threshold may be larger than the first threshold. In some embodiments, the first threshold and/or the second threshold may be default values set by the online to offline service system 100. In some embodiments, the first threshold and/or the second threshold may be adjustable according to various factors, e.g., different time periods, different locations, etc.

In 730, the processing engine 112 (e.g., the condition judgment unit 463) may determine whether the historical driving score is smaller than the first threshold.

In response to a determination that the historical driving score is smaller than the first threshold, the processing engine 112 (e.g., the order accepting mode determination unit 464 of the order accepting mode determination module 460) may designate the order quick-accepting mode as the order accepting mode for the target service provider in 740.

In response to a determination that the historical driving score is equal to or larger than the first threshold, the processing engine 112 (e.g., the condition judgment unit 463) may further determine whether the historical driving score is larger than the second threshold in 750.

In response to a determination that the historical driving score is larger than the second threshold, the processing engine 112 (e.g., the order accepting mode determination unit 464) may designate the order striving mode as the order accepting mode for the target service provider in 770.

In response to a determination that the historical driving score is smaller than or equal to the second threshold, the processing engine 112 (e.g., the order accepting mode determination unit 464) may designate the order designating mode as the order accepting mode for the target service provider in 760.

In some embodiments, the processing engine 112 may first perform operation 750 before operation 730. In some embodiments, the processing engine 112 may perform operations 730 and 750 simultaneously.

Figure 8A:
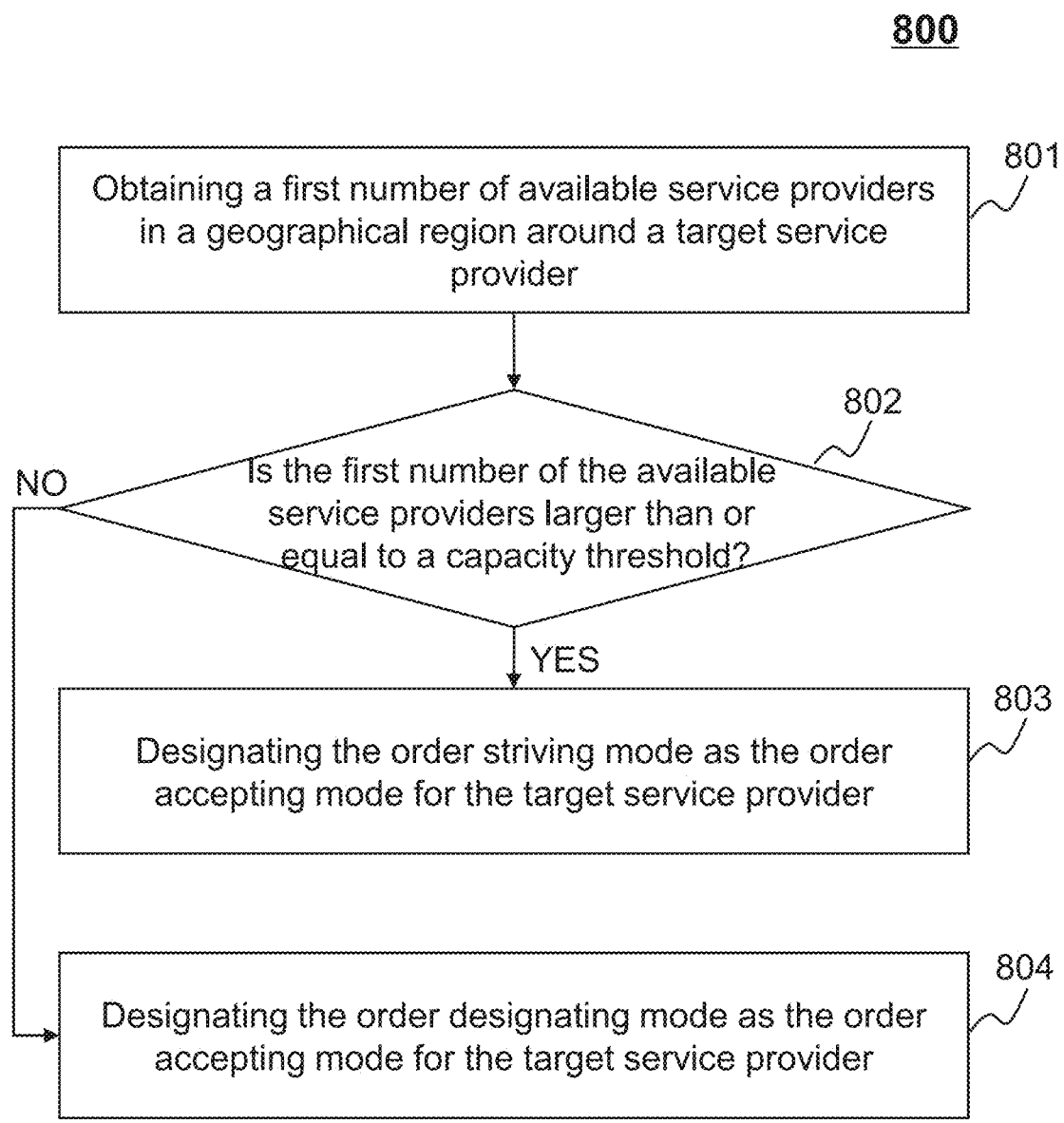
FIGS. 8A through 8D are flowcharts illustrating exemplary processes for determining an order accepting mode for a target service provider based on transport capacity according to some embodiments of the present disclosure.

FIG. 8A is a flowchart illustrating an exemplary process for determining an order accepting mode for a target service provider based on the transport capacity according to some embodiments of the present disclosure. In some embodiments, the process 800 may be implemented in the online to offline service system 100 as illustrated in FIG. 1. For example, the process 800 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 800 may be accomplished with one or more additional operations not described, and/or without one or more of the operations discussed.

In 801, the processing engine 112 (e.g., the evaluation parameter obtaining unit 461) may obtain a number of available service providers (also referred to herein as a first number of available service providers) in a geographical region around the target service provider from the transport capacity determination unit 452. The geographical region may be of any shape or size. The available service providers may refer to the service providers that are available to accept orders in the geographical region. In some embodiments, the transport capacity determination unit 452 may obtain location information of the service providers by the positioning modules of the service provider terminals, and identify all of service providers that are located in the geographical region. Then the transport capacity determination unit 452 may determine the second number of available service providers based on service status of the service providers.

After the processing engine 112 obtains the first number of available service providers in the geographical region around the target service provider, the processing engine 112 (e.g., the comparison unit 462) may compare the first number of available service providers with a capacity threshold. In some embodiments, the capacity threshold may be a default value set by the online to offline service system 100. In some embodiments, the capacity threshold may be adjustable according to various factors, e.g., different time periods, different locations, etc.

In 802, the processing engine 112 (e.g., the condition judgment unit 463) may determine whether the first number of available service providers is larger than or equal to the capacity threshold.

In response to a determination that the first number of available service providers is larger than or equal to the capacity threshold, the processing engine 112 (e.g., the order accepting mode determination unit 464) may designate the order striving mode as the order accepting mode for the target service provider in 803.

In response to a determination that the first number of available service providers is smaller than the capacity threshold, the processing engine 112 (e.g., the order accepting mode determination unit 464) may designate the order designating mode as the order accepting mode for the target service provider in 804.

Figure 8B:
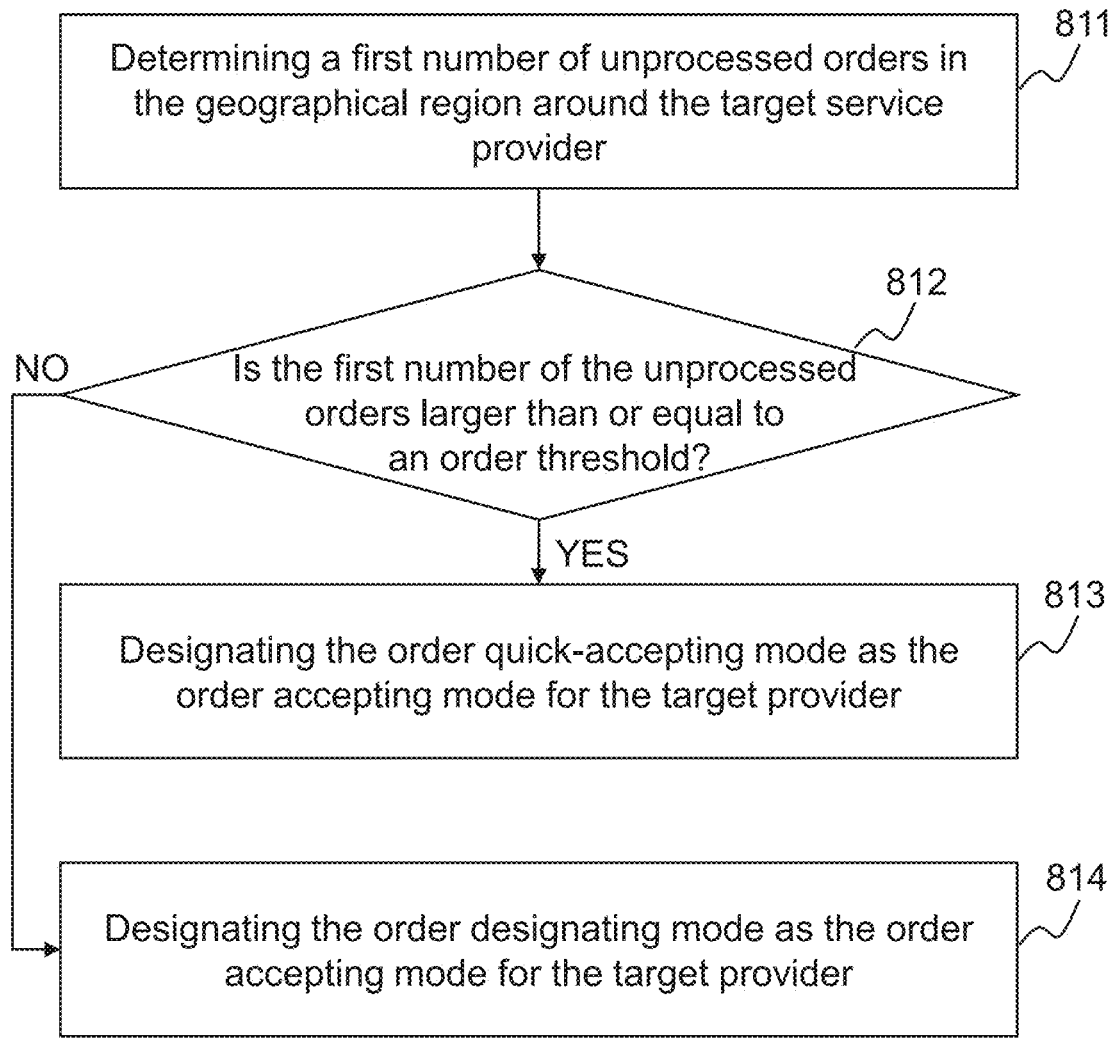

FIG. 8B is a flowchart illustrating an exemplary process for determining an order accepting mode for a target service provider based on the transport capacity according to some embodiments of the present disclosure. In some embodiments, the process 810 may be implemented in the online to offline service system 100 as illustrated in FIG. 1. For example, the process 810 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 810 may be accomplished with one or more additional operations not described, and/or without one or more of the operations discussed.

In 811, the processing engine 112 (e.g., the evaluation parameter unit 461) may obtain a first number of unprocessed orders (also referred to herein as a first number of unprocessed orders) relating to the transport capacity in the geographical region around the target service provider from the transport capacity determination unit 452. The unprocessed orders may refer to orders that are accepted by the server 110 but have not been allocated to server providers. In some embodiments, the server 110 may obtain orders from a plurality of service requesters. Each order may relate to a starting location. The starting location of the order may refer to a pick-up location. The starting location may be the same as or different from the current location of the service requester. The transport capacity determination unit 452 may identify, among the plurality of orders, the orders with the starting locations falling in the geographic region and not been allocated.

After the processing engine 112 obtains the first number of unprocessed orders in the geographical region around the target service provider, the processing engine 112 (e.g., the comparison unit 462) may compare the first number of unprocessed orders with an order threshold. In some embodiments, the order threshold may be a default value set by the online to offline service system 100. In some embodiments, the order threshold may be adjustable according to various factors, e.g., different time periods, different locations, etc.

In 812, the processing engine 112 (e.g., the condition judgment unit 463) may determine whether the first number of unprocessed orders is larger than or equal to the order threshold.

In response to a determination that the first number of unprocessed orders is larger than or equal to the order threshold, the processing engine 112 (e.g., the order accepting mode determination unit 464) may designate the order quick-accepting mode as the order accepting mode for the target service provider in 813.

In response to a determination that the first number of unprocessed orders is larger than or equal to the order threshold, the processing engine 112 (e.g., the order accepting mode determination unit 464) may designate the order designating mode as the order accepting mode for the target service provider in 814.

Figure 8C:
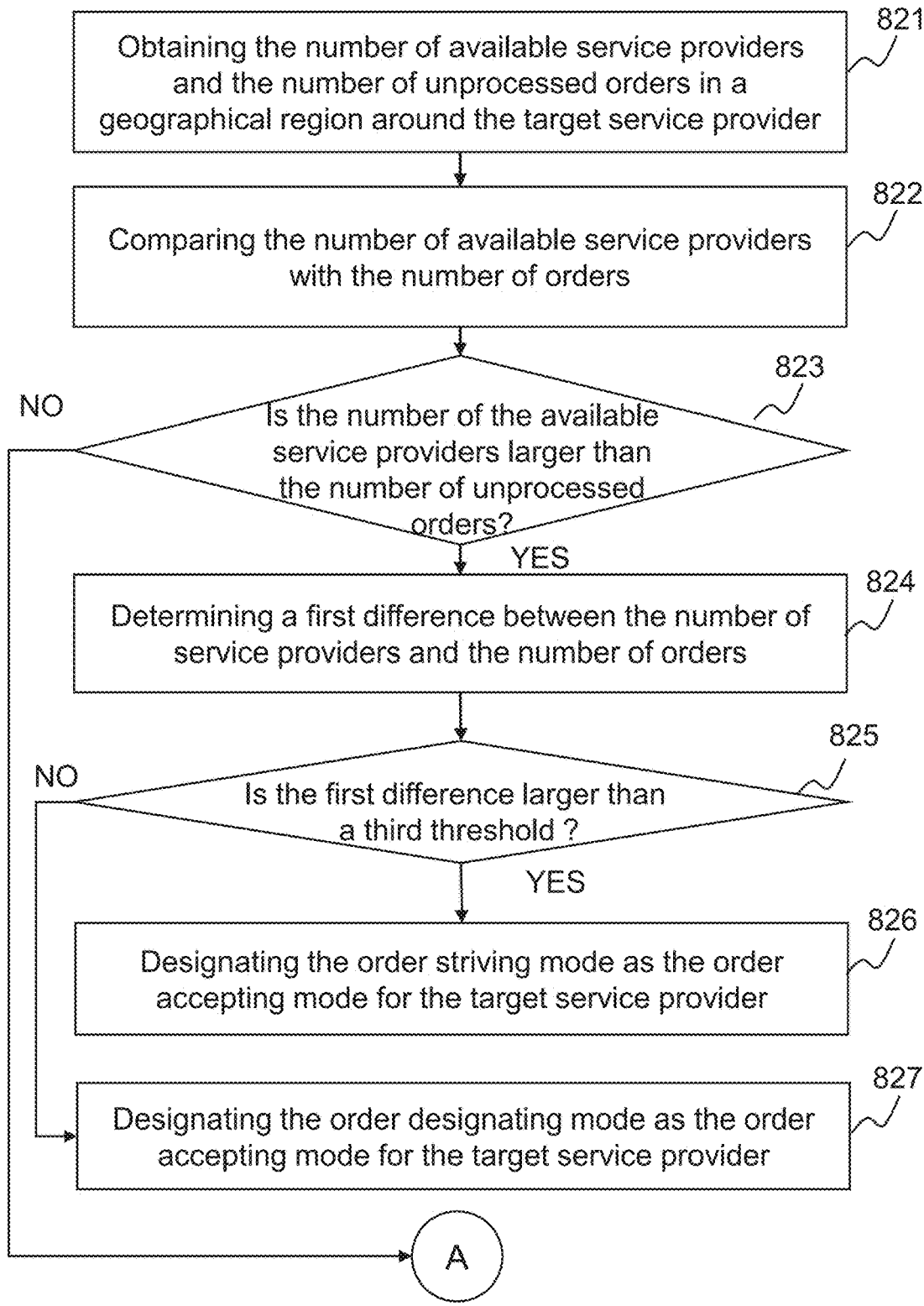
Figure 8D:
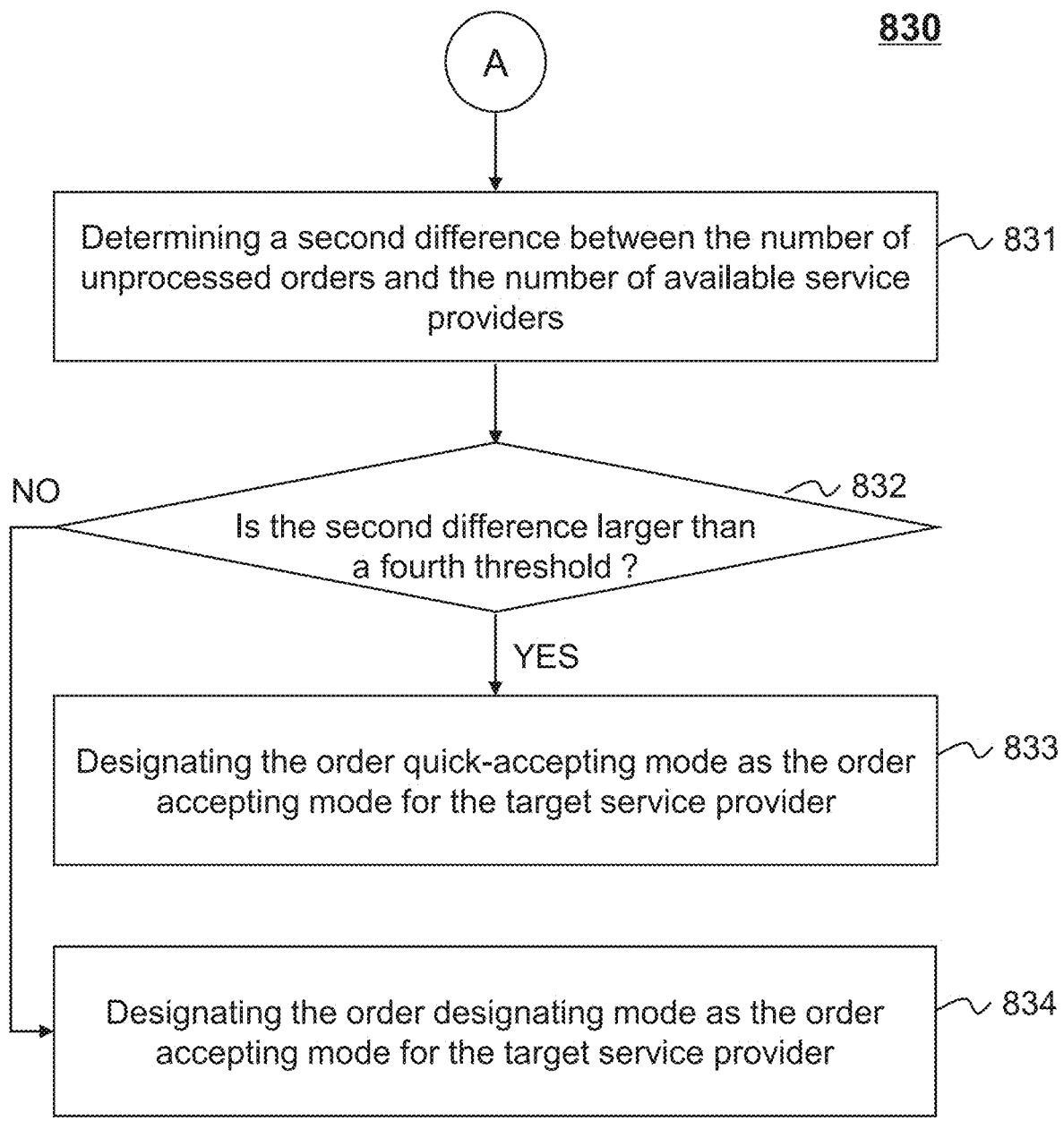

FIGS. 8C and 8D are flowchart illustrating exemplary processes for determining an order accepting mode for a target service provider based on the transport capacity according to some embodiments of the present disclosure. In some embodiments, the processes 820 and/or 830 may be implemented in the online to offline service system 100 as illustrated in FIG. 1. For example, the processes 820 and/or 830 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated processes presented below are intended to be illustrative. In some embodiments, the processes 820 and/or 830 may be accomplished with one or more additional operations not described, and/or without one or more of the operations discussed.

In 821, the processing engine 112 (e.g., the evaluation parameter unit 461) may obtain the number of available service providers and the number of unprocessed orders in the geographical region around the target service provider from the transport capacity determination unit 452.

In 822, the processing engine 112 (e.g., the comparison unit 462) may compare the number of available service providers with the number of unprocessed order.

In 823, the processing engine 112 (e.g., the condition judgment unit 463) may determine whether the number of available service providers is larger than the number of unprocessed orders.

In response to a determination that the number of available service providers is larger than the number of unprocessed orders, the processing engine 112 (e.g., a difference determination unit (not shown in FIG. 4G) of the order accepting mode determination module 460) may determine a first difference between the number of available service providers and the number of unprocessed orders in 824.

After the processing engine 112 determines the first difference between the number of available service providers and the number of unprocessed orders, the processing engine 112 (e.g., the comparison unit 462) may compare the first difference with a third threshold. In 825, the processing engine 112 (e.g., the condition judgment unit 463) may determine whether the first difference is larger than the third threshold.

In response to a determination that the first difference is larger than the third threshold, the processing engine 112 (e.g., the order accepting mode determination unit 464) may designate the order striving mode as the order accepting mode for the target service provider in 826.

In response to a determination that the number of available service providers is larger than the number of unprocessed orders and the first difference is smaller than or equal to the third threshold, the processing engine 112 (e.g., the order accepting mode determination unit 464) may designate the order designating mode as the order accepting mode for the target service provider in 827.

In response to a determination that the number of available service providers is smaller than or equal to the number of unprocessed orders, the process 820 may proceed to process 830 shown in FIG. 8D (represented as "A" in FIG. 8C).

In 831, the processing engine 112 (e.g., a difference determination unit (not shown in FIG. 4G) of the order accepting mode determination module 460) may determine a second difference between the number of unprocessed orders and the number of available service providers.

After the processing engine 112 determines the second difference between the number of unprocessed orders and the number of available service providers, the processing engine 112 (e.g., the comparison unit 462) may compare the second difference with a fourth threshold. The fourth threshold may be the same with or different from the third threshold. In 832, the processing engine 112 (e.g., the condition judgment unit 463) may determine whether the second difference is larger than the fourth threshold.

In response to a determination that the second difference is larger than the fourth threshold, the processing engine 112 (e.g., the order accepting mode determination unit 464) may designate the order quick-accepting mode as the order accepting mode for the target service provider in 833.

In response to a determination that the number of available service providers is smaller than or equal to the number of unprocessed orders and the second difference is smaller than or equal to the fourth threshold, the processing engine 112 (e.g., the order accepting mode determination unit 464) may designate the order designating mode as the order accepting mode for the target service provider in 834.

Figure 9:
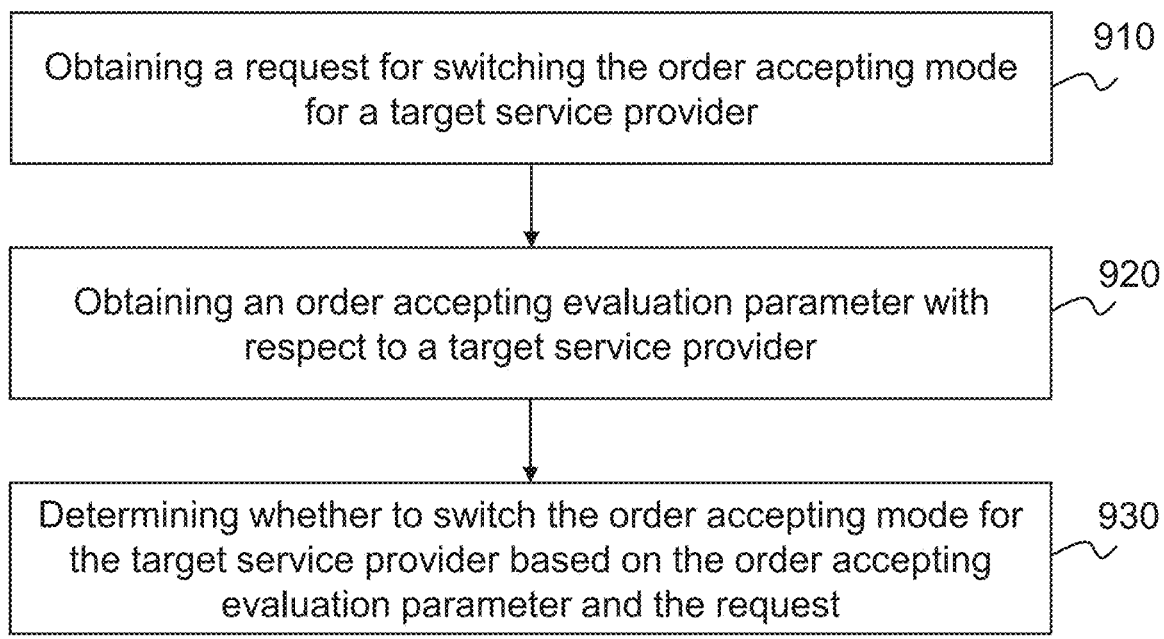
FIG. 9 is a flowchart illustrating an exemplary process for switching an order accepting mode for a target service provider according to some embodiments of the present disclosure.

FIG. 9 is a flowchart illustrating an exemplary process for determining whether to switch an order accepting mode for a target service provider according to some embodiments of the present disclosure. In some embodiments, the process 900 may be implemented in the online to offline service system 100 as illustrated in FIG. 1. For example, the process 900 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 900 may be accomplished with one or more additional operations not described, and/or without one or more of the operations discussed. Additionally, the order in which the operations of the process 600 as illustrated in FIG. 6 and described below is not intended to be limiting.

In 910, the processing engine 112 (e.g., the request obtaining module 430) may receive a request for switching the order accepting mode (also referred to herein as a mode switching request) for the target service provider. The mode switching request may include a request for switching the order accepting mode from an initial order accepting mode to a target order accepting mode. The initial order accepting mode may be any one of the order quick-accepting mode, the order designating mode, or the order striving mode. The target order accepting mode may also be any one of the order quick-accepting mode, the order designating mode, or the order striving mode. In some embodiments, the order switching request may be from the service provider terminal 140 associated with the target service provider. For example, after a time period during which a service provider accepts orders in the order designating mode or the order designating mode, he/she wants to accept more orders in the next time period or he/she wants to only select orders with particular attributes to accept (e.g., orders associated with destinations of airport), he/she may initiate a request for switching the order accepting mode from the order designating mode or the order designating mode to the order striving mode.

In some embodiments, the mode determination request may be generated by the processing engine 112 itself. For example, the processing engine 112 may monitor the transport capacity of a geographical region associated with the target service provider in real time. When the transport capacity satisfies a predetermined condition, the processing engine 112 may automatically switch the order accepting mode for the target service provider. Under such circumstances, the satisfaction of the predetermine condition may be treated as a request for switching the order accepting mode. For example, the number of orders in the specific time period is N1, and the number of orders in the next time period is N1+M, where M is larger than a threshold is the predetermined condition. When the predetermined condition is satisfied, i.e., M is larger than the threshold, the server 110 may switch the order accepting mode from the order designating mode to the order quick-accepting mode. As another example, the processing engine 112 may designate different order accepting modes for service providers in different time periods (e.g., different days), and the predetermined condition may be that the service providers log in the online to offline service system 100. When the predetermined condition is satisfied, i.e., the service provider logs in the online to offline service system 100, the processing engine 112 may switch the order accepting mode from an order accepting mode assigned for Mondays to an order accepting mode assigned for Sundays. As still another example, the processing engine 112 may designate different order accepting modes for different regions (e.g., different cities, different district), and the predetermined condition may be that the service provider moves from a region corresponding to a first order accepting mode to a region corresponding a second order accepting mode. When the predetermined condition is satisfied, i.e., the service provider moves from a region corresponding to a first order accepting mode to a region corresponding a second order accepting mode, the processing engine 112 may switch the order accepting mode for the service provider from the first order accepting mode to the second order accepting mode.

When the processing engine 112 (e.g., the order accepting mode determination module 460) receives the mode switching request, the processing engine 112 (e.g., the evaluation parameter determination module 450) may obtain an order accepting evaluation parameter with respect to the target service provider in 920. In some embodiments, the order accepting evaluation parameter may include a historical driving score associated with the target service provider, a transport capacity of a geographical region in which the target service provider terminal 140 associated with the target service provider may be located. The geographical region may be of any shape or size. For a real-time order, the transport capacity may relate to the current time. For a reserved order, the transport capacity may relate to a starting time relating to the reserved order.

In 930, the processing engine 112 (e.g., the order accepting mode determination module 460) may determine whether to switch the order accepting mode for the target service provider based on the order accepting evaluation parameter and the mode switching request. In some embodiments, the processing engine 112 may determine whether to switch the order accepting mode only based on the historical driving score associated with the target service provider. In some embodiments, the processing engine 112 may determine whether to switch the order accepting mode only based on the transport capacity of the geographical region in which the target service provider terminal 140 associated with the target service provider may be located. In some embodiments, the processing engine 112 may determine whether to switch the order accepting mode based on both the historical driving score and the transport capacity.

When the processing engine 112 (e.g., the order accepting mode determination module 460) determines that the order accepting mode with respect to the target service provider can be switched from the initial order accepting mode to the target order accepting mode, the order accepting mode determination module 460 may switch the order accepting mode from the initial order accepting mode to the target order accepting mode.

In some embodiments, when the processing engine 112 (e,g., the order accepting mode determination module 460) switches the order accepting mode with respect to the target service provider, the processing engine 112 may send a notice to the target service provider requesting the service provider to confirm that the order accepting mode has been switched and to confirm the target order accepting mode. The notice may be send via the network 120 and displayed on the service provider terminal 140 in a form of text, image, audio, video, etc. In some embodiments, the processing engine 112 may assign the target order accepting mode to the target service provider without requesting a confirmation.

Figure 10A:
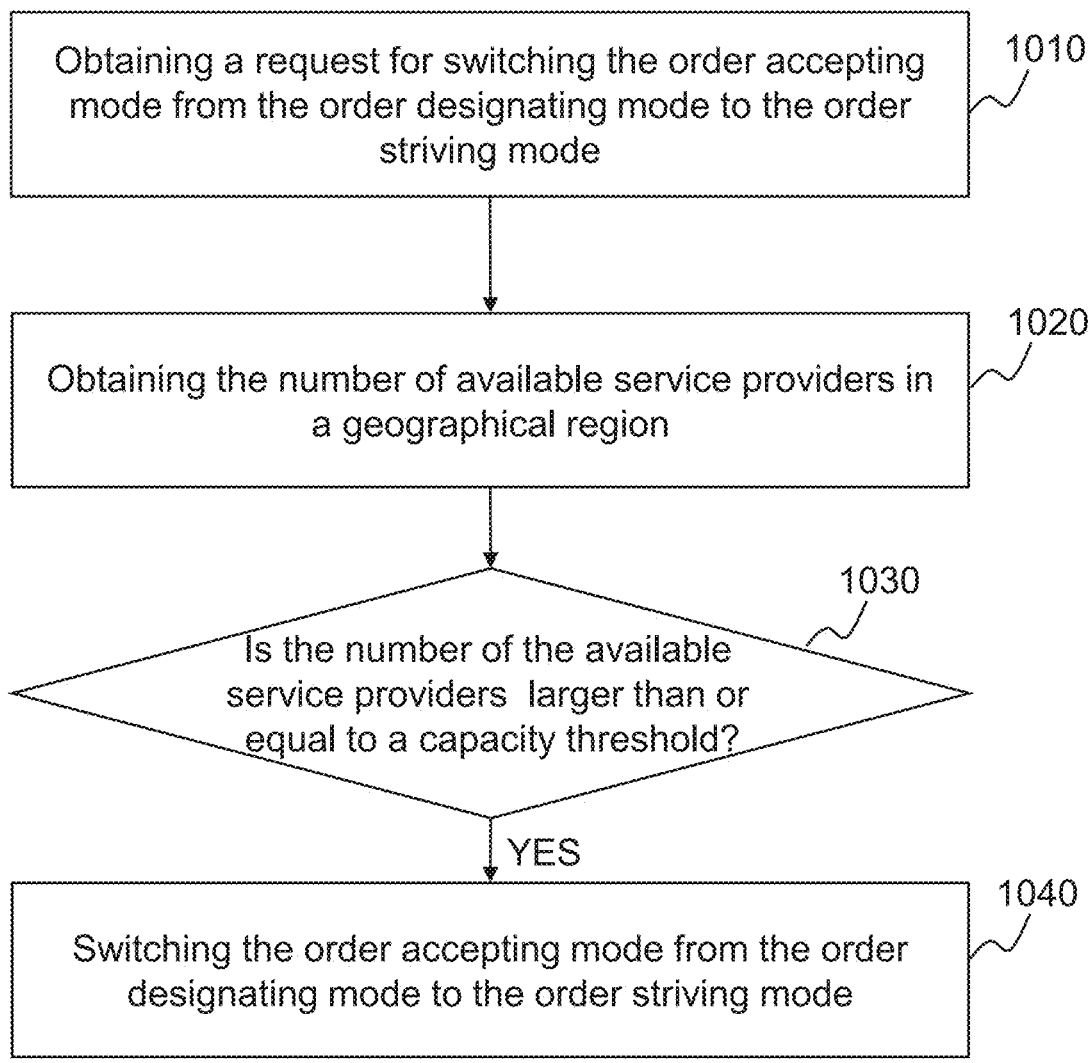
FIG. 10A is a flowchart illustrating an exemplary process for determining whether to switch an order accepting mode with respect to a target service provider from an order designating mode to an order striving mode based on the transport capacity according to some embodiments of the present disclosure.

FIG. 10A is a flowchart illustrating an exemplary process for determining whether to switch an order accepting mode with respect to a target service provider from an order designating mode to an order striving mode based on the transport capacity according to some embodiments of the present disclosure. In some embodiments, the process 1000 may be implemented in the online to offline service system 100 as illustrated in FIG. 1. For example, the process 1000 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1000 may be accomplished with one or more additional operations not described, and/or without one or more of the operations discussed.

In 1010, the processing engine 112 (e.g., the request obtaining module 430) may obtain a request for switching the order accepting mode with respect to the target service provider from the order designating mode to the order striving mode. In some embodiments, the processing engine 112 may obtain the request from the terminal (e.g., the service provider terminal 140) associated with the target service provider.

In 1020, the processing engine 112 (e.g., the evaluation parameter obtaining unit 461) may obtain the transport capacity (e.g., the number of available service providers) in a geographical region around the target service provider from the transport capacity determination unit 452. The geographical region may be of any shape or size. In some embodiments, the transport capacity determination unit 452 may identify all of service providers that are located in the geographic region and determine the number of available service providers based on service status of the service providers. For example, the transport capacity determination unit 452 may obtain location information by a positioning module of the service provider terminal.

After the processing engine 112 obtains the number of available service providers in the geographical region around the target service provider, the processing engine 112 (e.g., the comparison unit 462) may compare the number of available service providers with a capacity threshold. In some embodiments, the capacity threshold may be a default value set by the online to offline service system 100. In some embodiments, the capacity threshold may be adjustable according to various factors, e.g., different time periods, different locations, etc.

In 1030, the processing engine 112 (e.g., the condition judgment unit 463) may determine whether the number of available service providers is larger than or equal to the capacity threshold.

In response to a determination that the number of available service providers is larger than or equal to the capacity threshold, the processing engine 112 (e.g., the order accepting mode determination unit 464) may switch the order accepting mode for the target service provider from the order designating mode to the order striving mode in 1040.

In response to a determination that the first number of available service providers is smaller than the capacity threshold, the processing engine 112 (e.g., the order accepting mode determination unit 464) may not respond to the mode switching request.

It should also be noted that the above description about the process for switch the order accepting mode for the target service provider based on the number of available service providers corresponding to the transport capacity is merely an example, and not intended to be limiting. In some embodiments, the processing engine 112 may also determine whether to switch the order accepting mode for the target service provider from the order designating mode to the order striving mode based on the number of unprocessed order in the geographical region around the target service provider. In some embodiments, the processing engine 112 may also determine whether to switch the order accepting mode for the target service provider from the order designating mode to the order striving mode based on the number of unprocessed order and the number of available service providers in the geographical region around the target service provider.

Figure 10B:
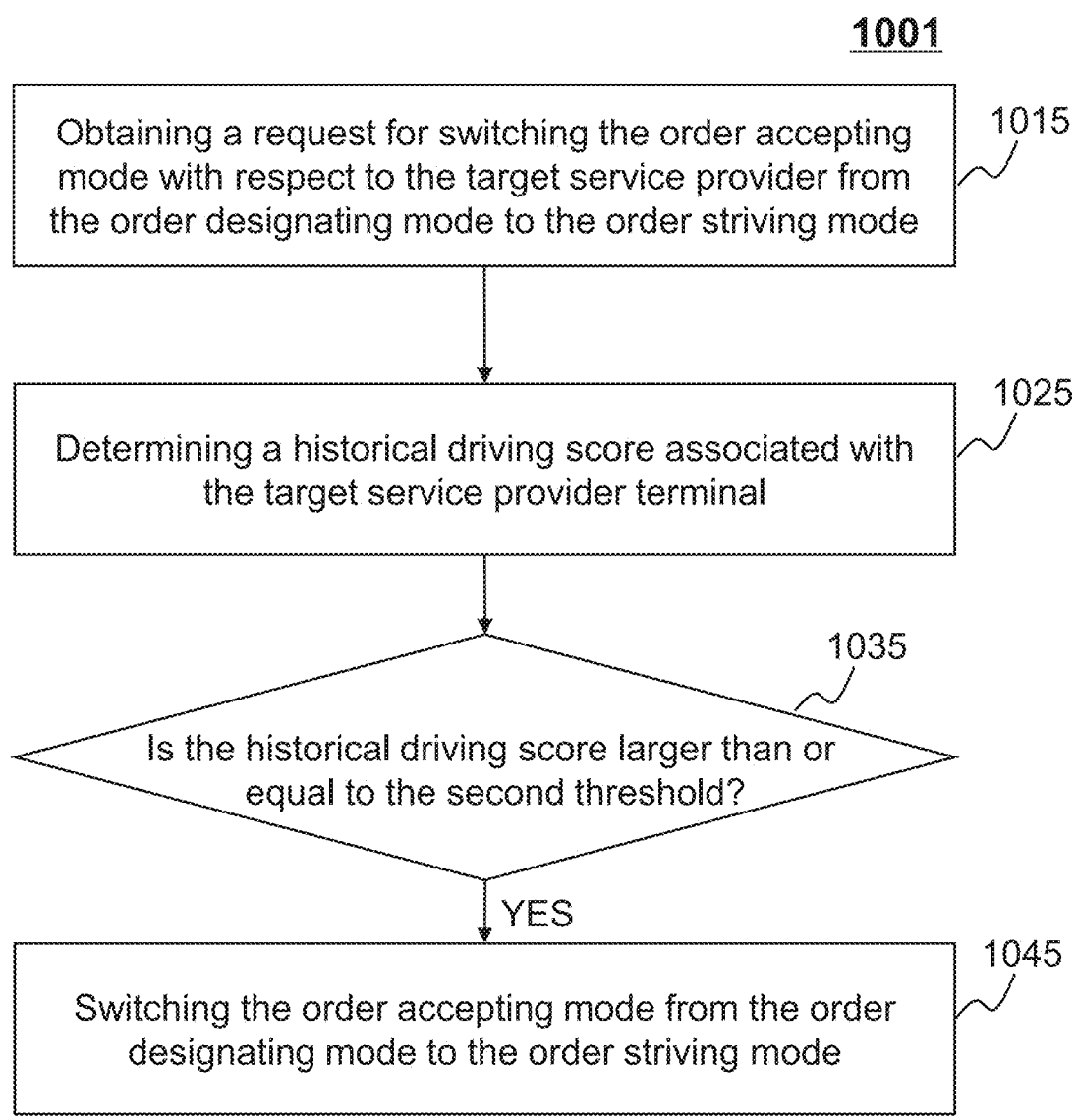
FIG. 10B is a flowchart illustrating an exemplary process for switching an order accepting mode for a target service provider based on the historical driving score according to some embodiments of the present disclosure.

FIG. 10B is a flowchart illustrating an exemplary process for switching an order accepting mode for a target service provider from an order designating mode to an order striving mode based on a historical driving score of the target service provider according to some embodiments of the present disclosure. In some embodiments, the process 1001 may be implemented in the online to offline service system 100 as illustrated in FIG. 1. For example, the process 1001 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1001 may be accomplished with one or more additional operations not described, and/or without one or more of the operations discussed.

In 1015, the processing engine 112 (e.g., the request obtaining module 430) may obtain a request for switching the order accepting mode with respect to the target service provider from the order designating mode to the order striving mode. In some embodiments, the processing engine 112 may obtain the request from the terminal (e.g., the service provider terminal 140) associated with the target service provider.

In 1025, the processing engines 112 (e.g., the evaluation parameter obtaining unit 461) may obtain a historical driving score associated with the target service provider from the evaluation parameter determination module 450, e.g., the driving score determination unit 451. In some embodiments, the driving score determination unit 451 may determine the historical driving score based on historical service data relating to the target service provider, e.g., the total number of historical orders that the target service provider has accepted, the total number of historical orders that the target service provider has finished, the service quality of the target service provider based on the service requesters' feedbacks, a historical order completion rate, a historical order accepting rate, a historical order rejecting rate, or the like, or any combination thereof. The historical order completion rate may be a ratio between the total number of historical orders that the target service provider has finished and the total number of historical orders that the target service provider has accepted. In some embodiments, the driving score determination unit 451 may use a predetermined evaluation model based on historical service data (e.g., the historical order completion rate) of the target service provider to determine the historical driving score associated with the target service provider.

After the processing engine 112 obtains the historical driving score associated with the target service provider, the processing engine 112 (e.g., the comparison unit 462) may compare the historical driving score with the second threshold. In some embodiments, the second threshold may be a default value set by the online to offline service system 100. In some embodiments, the second threshold may be adjustable according to various factors, e.g., different time periods, different locations, etc.

In 1035, the processing engine 112 (e.g., the condition judgment unit 463) may determine whether the historical driving score is larger than or equal to the second threshold.

In response to a determination that the historical driving score is larger than or equal to the second threshold, the processing engine 112 (e.g., the order accepting mode determination unit 464) may switch the order accepting mode for the target service provider from the order designating mode to the order striving mode.

In some embodiments, the processing engine 112 may determine whether to switch the order accepting mode for the target service provider from the order designating mode to the order striving mode based on both the transport capacity and the historical driving score associated with the target service provider. Only when both the transport capacity satisfies a capacity condition and the historical driving score satisfies a score condition, e.g., only when the number of the available service provider is larger than or equal to the capacity threshold and the historical scores of the target service provider is larger than or equal to the second threshold, the processing engine 112 may switch the order accepting mode for the target service provider from the order designating mode to the order striving mode.

When the processing engine 12 determines the order accepting modes for service providers, the service providers may accept orders in the corresponding order accepting modes.

Figure 11:
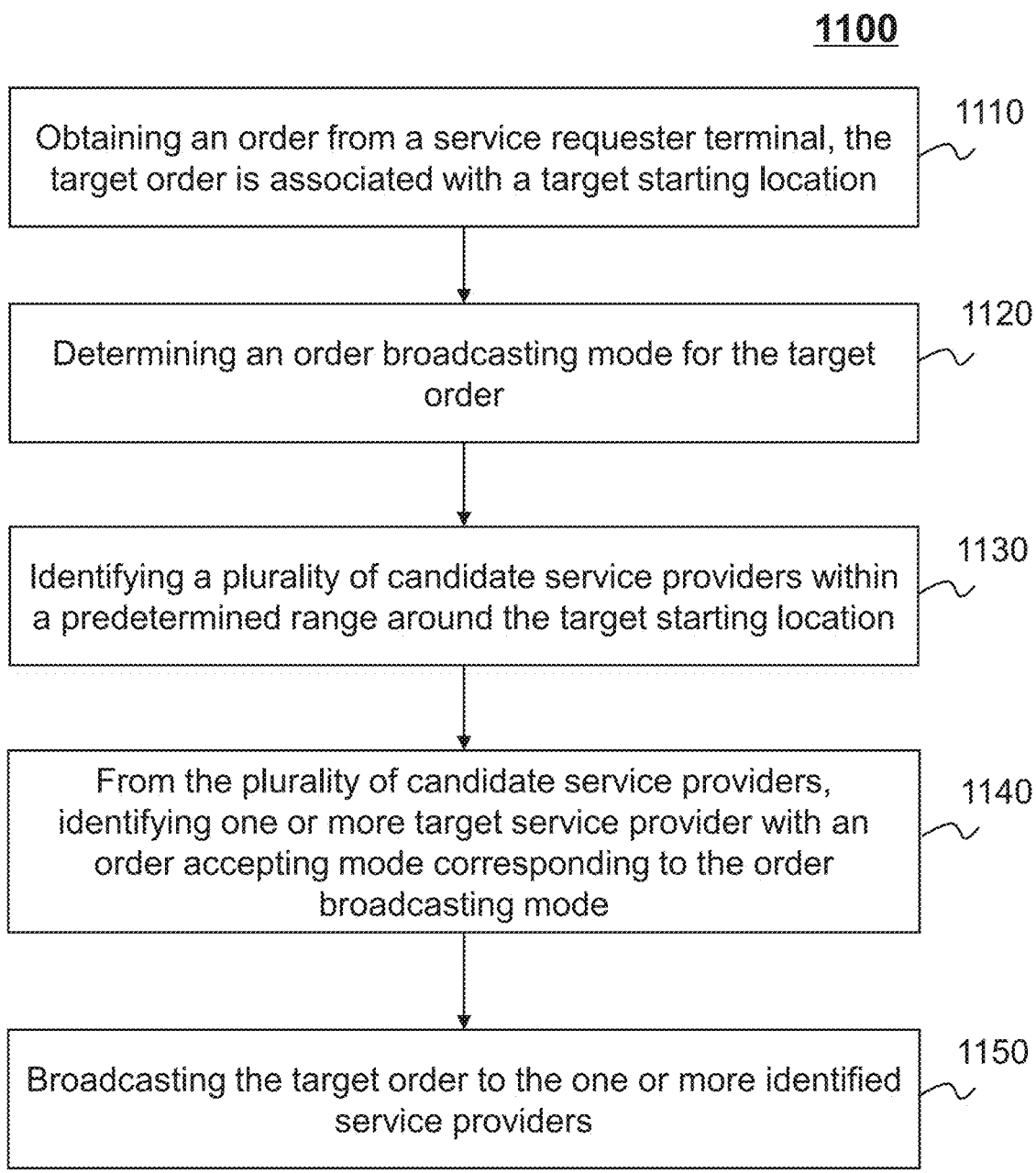
FIG. 11 is a flowchart illustrating an exemplary process for broadcasting a target order according to some embodiments of the present disclosure.

FIG. 11 is a flowchart illustrating an exemplary process for broadcasting a target order according to some embodiments of the present disclosure. In some embodiments, the process 1100 may be implemented in the online to offline service system 100 as illustrated in FIG. 1. For example, the process 1100 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1100 may be accomplished with one or more additional operations not described, and/or without one or more of the operations discussed. Additionally, the order in which the operations of the process 900 as illustrated in FIG. 9A and described below is not intended to be limiting.

In some embodiments, an order may be broadcasted in one of three order broadcasting modes. Each of the three order broadcasting modes may corresponding to one of the three order accepting modes for service providers. For illustration purposes, an order broadcasting mode corresponding to the order striving mode may be referred to herein as a first broadcasting mode or an order striving broadcasting mode; an order broadcasting mode corresponding to the order designating mode may be referred to herein as a second broadcasting mode or an order designating-broadcasting mode; and an order broadcasting mode corresponding to the order quick-accepting mode may be referred to herein as a third broadcasting mode, an order quick-broadcasting mode, or an order quick-allocating mode.

In 1110, the processing engine 112 (e.g., the order obtaining module 440) may obtain a target order from a service requester terminal. The information relating to the target order may include a target starting location of the target order, a target destination of the target order, a current location associated with service requester terminal, a starting time, or the like, or any combination thereof. The target order may be a real-time order or a reserved order.

In 1120, the processing engine 112 (e.g., the order broadcasting mode determination module 470) may determine an order broadcasting mode for the target order. In some embodiments, the processing engine 112 may determine the order broadcasting mode for the target order based on the starting location of the target order. For example, if the starting location of the target order is in a city and the order accepting modes of service providers in the city is configured to be a particular order accepting mode (e.g., the order quick-accepting mode), the processing engine 112 (e.g., the order broadcasting mode determination module 470) may designate an order broadcasting mode corresponding to the particular order accepting mode as the order broadcasting mode for the target order. Then the processing engine 112 may broadcast the target order in the determined order broadcasting mode, In some embodiments, the processing engine 112 (e.g., the order broadcasting mode determination module 470) may determine the order broadcasting mode for the target order based on the transport capacity around the starting location of the target order. The determination of the order broadcasting mode for the target order based on the transport capacity around the starting location of the target order may be found in FIGS. 12A and 12B and relevant descriptions thereof.

In some embodiment, when the order broadcasting mode is determined, the processing engine 112 may identify one or more service providers in the order accepting mode corresponding to the determined order broadcasting mode. In some embodiments, when the processing engine 112 broadcasts an order, the processing engine 112 may only broadcast the order to service providers in a predetermined range around a starting location of the order. In some embodiments, when the service providers are in different order accepting model, the processing engine 112 may further select service providers in the order accepting mode corresponding to the order broadcasting mode of the order. In some embodiments, if a service provider is in a suitable order accepting mode but the location of the service provider (e.g., the location corresponding to a starting time of the order) is far from the starting location the order, the processing engine 112 may not broadcast the order to the service provider.

Therefore, to determine suitable service providers for the target order, the processing engine 112 (e.g., the service provider selection module 480) may identify one or more candidate service providers within a predetermined range around the target starting location of the target order in 1130. The predetermined range may be in any shape or size. For example, the predetermined range may be a circular region with a two kilometer radius centered at the target starting location of the target order. In some embodiments, the predetermined range may be fixed or be adjustable by the online to offline service system 100. In some embodiments, the predetermined range may be the same for different order broadcasting modes. In some embodiments, the predetermined range may be adjustable according to different order broadcasting modes.

In 1140, the processing engine 112 (e.g., the service provider selection module 480) may further identify one or more service providers from the plurality of candidate service providers. The one or more identified service providers may have an order accepting mode corresponding to the determined order broadcasting mode for the target order.

In 1150, the processing engine 112 may broadcast the target order to the one or more identified service providers in the determined order broadcasting mode.

In some embodiments, if the order broadcasting mode for the target order corresponds to the order quick-accepting mode, i.e., the order broadcasting mode for the target order is the third broadcasting mode, the processing engine 112 may transmit the target order to one service provider of the one or more identified service provider directly. In some embodiments, the service provider accepting the target order may be any one of the one or more identified service providers. In some embodiments, the service provider accepting the target order may be selected according to some factors, e.g., historical driving scores of the one or more identified service providers.

If the order broadcasting mode for the target order corresponds to the order designating mode, i.e., the order broadcasting mode for the target order is the second broadcasting mode, the processing engine 112 may further select a number (e.g., two, three, four, five) of service providers from the one or more identified service providers to broadcast the target order according to some factors, e.g., historical driving scores of the one or more identified service providers. For example, after the processing engine 112 broadcasts the target order to the selected service providers, the processing engine 112 may transmit the target order to a service provider of the selected service providers. If the service provider does not accept the target order in a predetermined time period (e.g., 15 second, 30 second), the processing engine 112 may further transmit the target order to another service provider of the selected service providers until the target order is accepted. In some embodiments, if none of the selected service providers accept the target order, the processing engine 112 may reselect the service providers from the one or more identified service providers or adjust the predetermined range to re-determine the candidate service providers.

If the order broadcasting mode for the target order corresponds to the order striving mode, i.e., the order broadcasting mode for the target order is the first broadcasting mode, the processing engine 112 may further select a number (e.g., two, three, four, five) of service providers from the one or more identified service providers to broadcast the target order according to some factors, e.g., historical driving scores of the one or more identified service providers. In this case, the number of selected service providers may be larger than the number of selected service providers when the order broadcasting mode is the second broadcasting mode. After the processing engine 112 broadcasts the target order to the selected service providers in the order striving mode, the processing engine 112 may determine the service provider that responds first to the broadcasting of the target order. Then the processing engine 112 may designate the target order to the service provider that responds first. In some embodiments, two or more service providers may respond at the same time, then the processing engine 112 may determine one of the two or more service providers (also referred to as a final service provider) to accept the target order. In some embodiments, the final service provider may be any one of the two or more service provider. In some embodiments, the processing engine 112 may determine the final service provider from the two or more service providers according to some factors, e.g., historical driving scores of the two or more service providers.

Figure 12A:
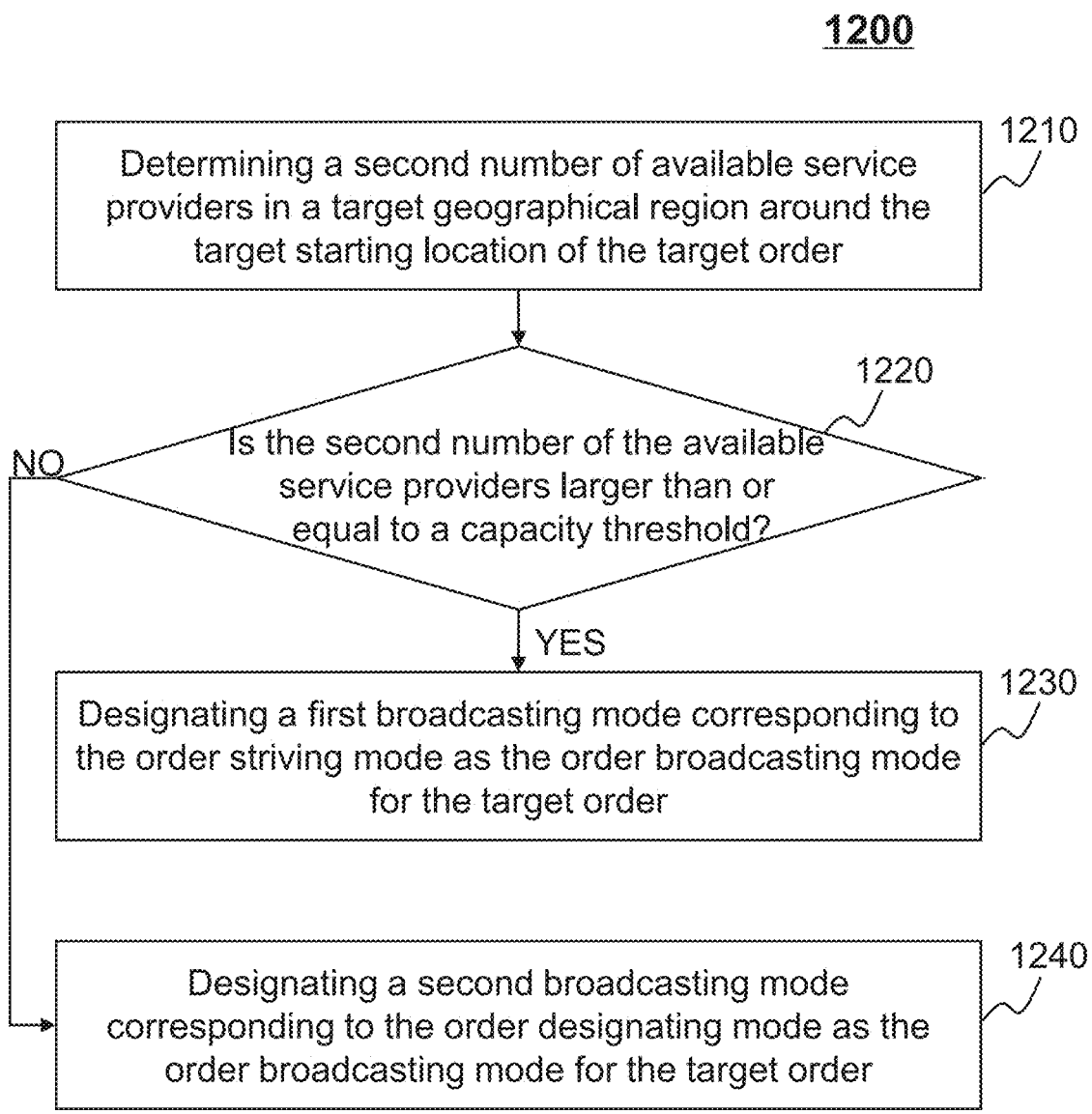
FIGS. 12A and 12B are flowchart illustrating exemplary processes for determining an order broadcasting mode for a target order according to some embodiments of the present disclosure.

FIG. 12A is a flowchart illustrating an exemplary process for determining an order broadcasting mode for a target order according to some embodiments of the present disclosure. In some embodiments, the process 1200 may be implemented in the online to offline service system 100 as illustrated in FIG. 1. For example, the process 1200 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12A and described below is not intended to be limiting. In some embodiments, the operation 1120 of the process 1100 may be performed according to the process 1200.

In 1210, the processing engine 112 (e.g., the evaluation parameter obtaining unit 471) may obtain a number of available service providers (also referred to herein as a second number of available service providers) in a target geographical region around the target starting location of the target order from the transport capacity determination unit 452. The target geographical region may be of any shape or size. The available service providers may refer to service providers that are available in the target geographical region. In some embodiments, the transport capacity determination unit 452 may obtain location information of service providers by the positioning modules of the service provider terminals, and identify all service providers that are located in the target geographical region. Then the transport capacity determination unit 452 may determine the second number of available service providers based on service status of the service providers.

After the processing engine 112 obtains the second number of available service providers in the target geographical region around the target starting location, the processing engine 112 (e.g., the comparison unit 472) may compare the second number of available service providers with a capacity threshold. In some embodiments, the capacity threshold may be a default value set by the online to offline service system 100. In some embodiments, the capacity threshold may be adjustable according to various factors, e.g., different time periods, different locations, etc.

In 1220, the processing engine 112 (e.g., the condition judgment unit 473) may determine whether the second number of available service providers is larger than or equal to the capacity threshold.

In response to a determination that the second number of available service providers is larger than or equal to the capacity threshold, the processing engine 112 (e.g., the order broadcasting mode determination unit 474) may designate the first broadcasting mode corresponding to the order striving mode as the order broadcasting mode for the target order in 1230.

In response to a determination that the second number of available service providers is smaller than the capacity threshold, the processing engine 112 (e.g., the order broadcasting mode determination unit 474 of the order broadcasting mode determination module 470) may designate the second broadcasting mode corresponding to the order designating mode as the order broadcasting mode for the target order in 1240.

Figure 12B:
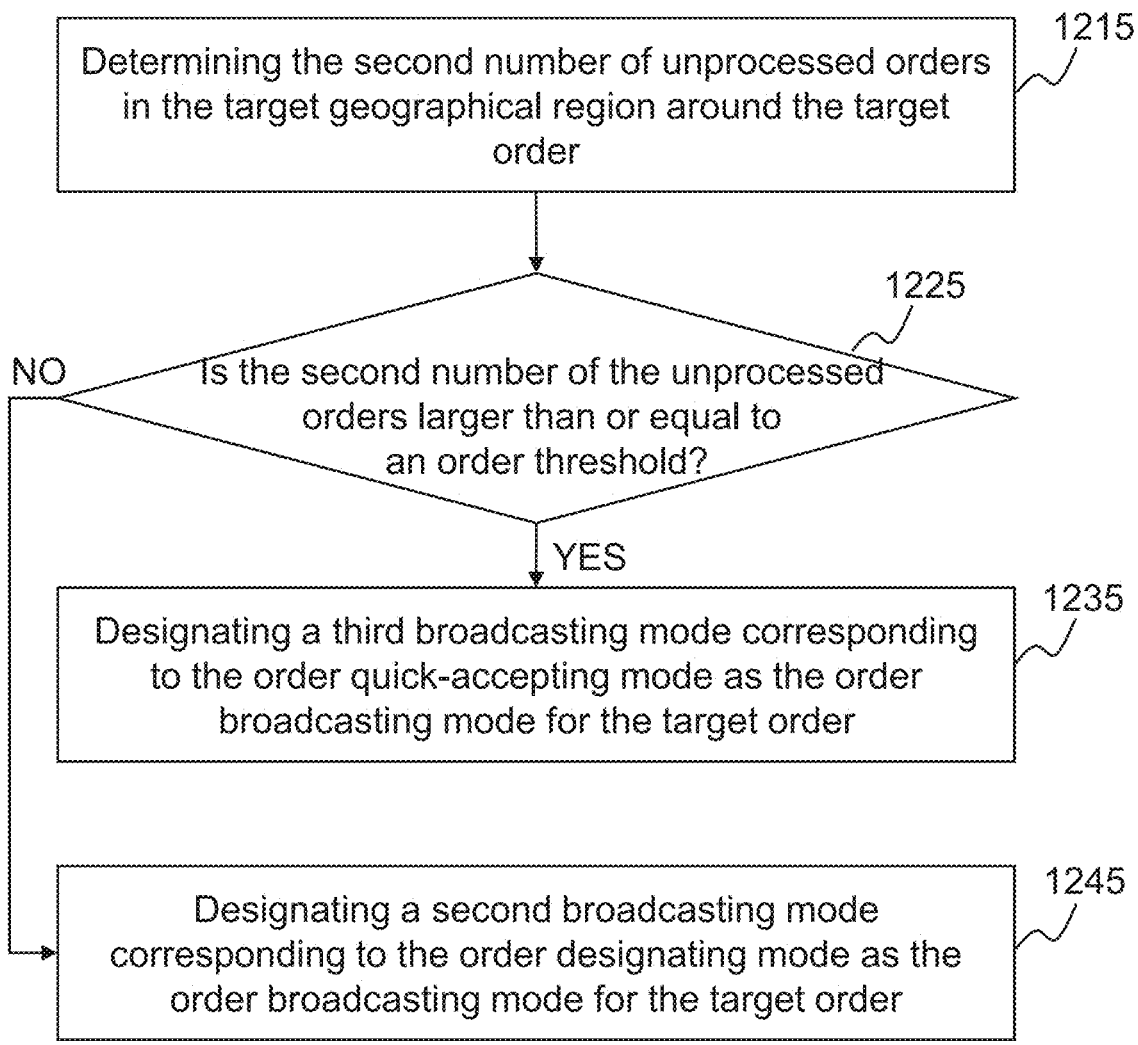

FIG. 12B is a flowchart illustrating an exemplary process for determining an order broadcasting mode for the target order according to some embodiments of the present disclosure. In some embodiments, the process 1250 may be implemented in the online to offline service system 100 as illustrated in FIG. 1. For example, the process 1250 may be stored in the storage 150 and/or other storage (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1250 may be accomplished with one or more additional operations not described, and/or without one or more of the operations discussed. Additionally, the order in which the operations of the process 1250 as illustrated in FIG. 12B and described below is not intended to be limiting. In some embodiments, the operation 1120 of the process 900 may be performed according to the process 1250.

In 1215, the processing engine 112 (e.g., the evaluation parameter unit 471) may obtain a number of unprocessed orders (also referred to herein as a second number of unprocessed orders) in the target geographical region around the target starting location of the target order from the transport capacity determination unit 452. The unprocessed orders may refer to orders that are accepted by the server 110 but have not been allocated to server providers. In some embodiments, the server 110 obtain orders from a plurality of service requesters. Each order may relate to a starting location. The starting location of the order may refer to a pick-up location. The starting location may be the same as or different from the current location of the service requester. The transport capacity determination unit 452 may identify, among the plurality of orders, the order with the starting locations falling in the target geographical region and not been allocated.

After the processing engine 112 obtains the second number of unprocessed orders in the geographical region around the target starting location, the processing engine 112 (e.g., the comparison unit 472) may compare the second number of unprocessed orders with an order threshold. In some embodiments, the order threshold may be a default value set by the online to offline service system 100. In some embodiments, the order threshold may be adjustable according to various factors, e.g., different time periods, different locations, etc.

In 1215, the processing engine 112 (e.g., the condition judgment unit 473) may determine whether the second number of unprocessed orders is larger than or equal to the order threshold.

In response to a determination that the second number of unprocessed orders is larger than or equal to the order threshold, the processing engine 112 (e.g., the order broadcasting mode determination unit 474) may designate the third broadcasting mode corresponding to the order quick-accepting mode as the order broadcasting mode for the target order in 1235.

In response to a determination that the second number of unprocessed orders is larger than or equal to the order threshold, the processing engine 112 (e.g., the order broadcasting mode determination unit 474) may designate the second broadcasting mode corresponding to the order designating mode as the order broadcasting mode for the target order in 1245.

It should be noted that the processes 1200 and 1250 are merely examples for determining an order broadcasting mode for a target order, and not intended to be limiting. In some embodiments, the processing engine 112 (e.g., the order broadcasting mode determination module 470) may determine the order broadcasting mode for the target order based on both of the number of available service providers and the number of unprocessed orders in the target geographical region around the target starting location of the target order. For example, the processing engine 112 (e.g., the order broadcasting mode determination module 470) may compare the number of available service providers with the number of unprocessed orders in the target geographical region. If the number of available service providers is larger than the number of unprocessed orders, the processing engine 112 may further determine a difference (also referred to herein as a third difference) between the number of available service providers and the number of unprocessed orders. Only when the third difference is larger than a threshold, the processing engine 112 (e.g., the order broadcasting mode determination module 470) may designate the first broadcasting mode as the order broadcasting mode for the target order. In some embodiments, the number of available service providers is larger than the number of unprocessed orders and the third difference is smaller than or equal to the threshold, the processing engine 112 (e.g., the order broadcasting mode determination module 470) may designate the second broadcasting mode as the order broadcasting mode for the target order.

In some embodiments, when the number of available service providers is smaller than or equal to the number of unprocessed orders, the processing engine 112 may determine a difference (also referred to herein as a fourth difference) between the number of unprocessed orders and the number of available service providers. Only when the fourth difference is larger than a threshold, the processing engine 112 (e.g., the order broadcasting mode determination module 470) may designate the third broadcasting mode as the order broadcasting mode for the target order. In some embodiments, when the number of unprocessed orders is larger than the number of available service providers and the fourth difference is smaller than or equal to the threshold, the processing engine 112 (e.g., the order broadcasting mode determination module 470) may designate the second broadcasting mode as the order broadcasting mode for the target order.

Figure 13A:
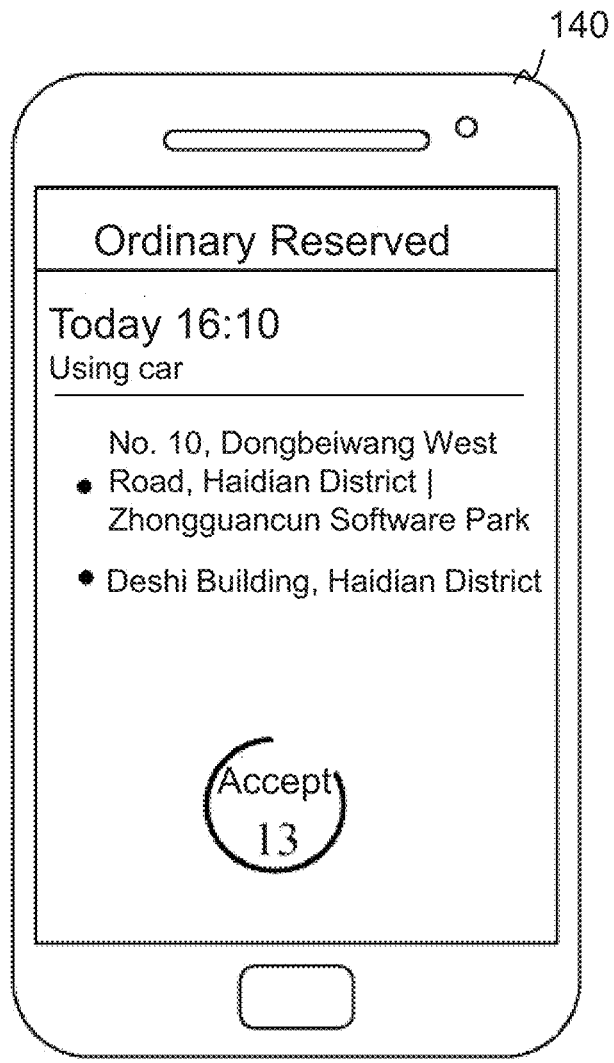
FIGS. 13A through 13C are schematic diagrams illustrating exemplary initial order accepting interfaces of a service provider terminal in different order accepting modes according to some embodiments of the present disclosure.
Figure 13B:
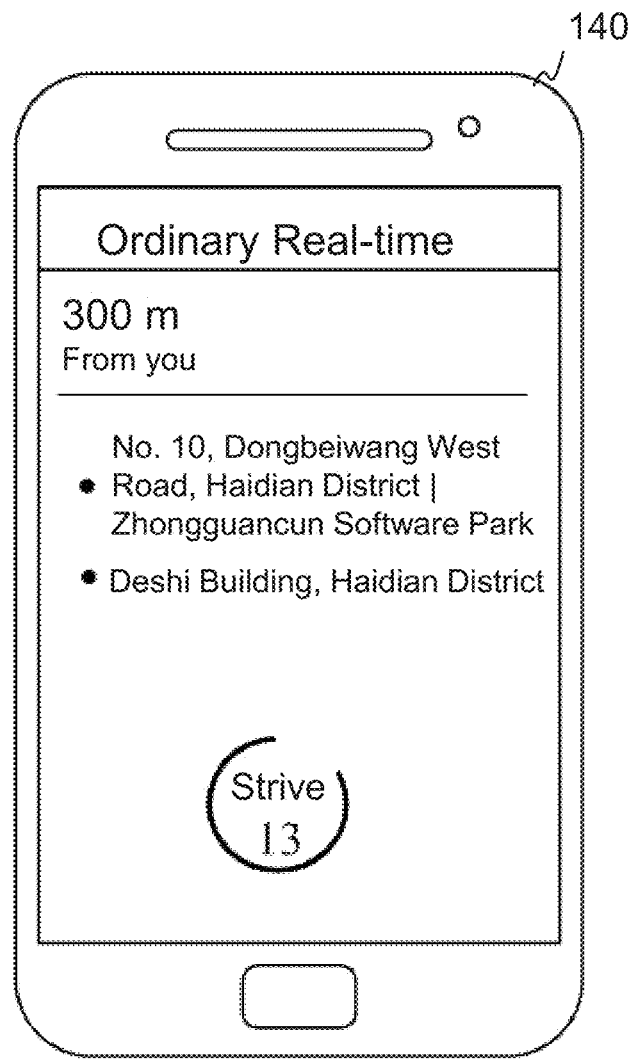
Figure 13C:
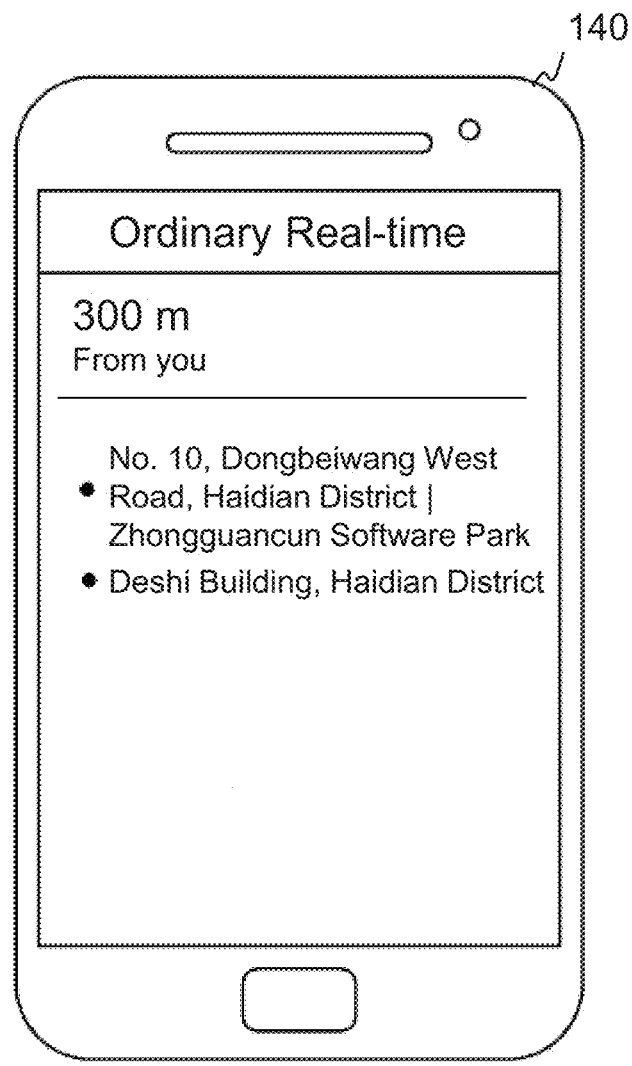

FIGS. 13A through 13C are schematic diagrams illustrating initial order accepting interfaces of a service provider terminal in different order accepting modes according to some embodiments of the present disclosure.

As shown in FIGS. 13A through 13C, assume that a starting location of an order is "No. 10, Dongbeiwang West Road, Haidian District| Zhongguancun Software Park," and a destination of the order is "Deshi Building, Haidian District." As shown in FIG. 13A, in the order designating mode, the order time information, for example, "Today 16:10" is displayed in a first region of the initial order accepting interface; an order type, for example, "Ordinary Reserved" is displayed on top of the initial order accepting interface; and the order accepting identifier including an operation button "Accept", an operation feedback status, and a left operational time (e.g., 13 seconds) are displayed in a second region of the initial order accepting interface. As shown in FIGS. 13B and 13C, in the order striving mode or the order quick-accepting mode, the order distance information, for example, "300 meters from you" is displayed in the first region of the initial order accepting interface; and in the order striving mode, the order striving identifier including an operation button (showing, e.g., "strive"), an operation feedback status, and a left operational time (e.g., 13 seconds) are displayed in the second region of the initial order accepting interface.

In the embodiment, the order time information is displayed in the first region when the order accepting mode is the order designating mode, and the order distance information is displayed in the first region when the order accepting mode is the order striving or the order quick-accepting mode. In the order designating mode, when the order time information is displayed in the first region of the initial order accepting interface, the driver may pay more attention to the time of picking up the passenger relating to the order. In the order striving mode and the order quick-accepting mode, due to the real-time characteristics, when the distance information is displayed in the first region of the initial order accepting interface, the driver may pay more attention to the distance information. Especially in the order striving mode, it may provide a reference for drivers to decide whether to strive for the order. In addition, the order accepting identifier is displayed in the second region when the order accepting mode is the order designating mode, and the order striving identifier is displayed in the second region when the order accepting mode is the order striving mode. In this way, the user may be reminded to accept, reject, or strive for an order, thereby improving the user experience.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system configured to operate an online to offline service platform to interact with service receivers and service providers through order processing, comprising:
at least one storage medium including a first set of instructions for determining an order accepting mode for a service provider terminal associated with the online to offline service platform; and
at least one processor in communication with the at least one storage medium, wherein when executing the first set of instructions, the at least one processor is directed to:
receive a request for determining an order accepting mode for a target service provider terminal;
determine a first number count of available service providers corresponding to a transport capacity of a geographical region based on real-time collection of positioning signals of available service provider terminals in the geographical region via a network;
determine whether the first number count of available service providers is larger than or equal to a capacity threshold;
in response to a determination that the first number count of available service providers is larger than or equal to the capacity threshold,
designate an order striving mode as the order accepting mode for the target service provider terminal, wherein under the order striving mode, the target service provider terminal receives an order that is sent to multiple service provider terminals, each service provider associated with one of the service provider terminals has a right to decide whether to strive to accept the order;
generate a first order accepting interface corresponding to the order striving mode; and
send, via the network, the first order accepting interface to direct the target service provider terminal to display the first order accepting interface by displaying distance information of an order in a first region of the first order accepting interface, wherein the distance information provides a reference for the target service provider to decide whether to strive for the order; and in response to a determination that the first number count of available service providers is smaller than the capacity threshold,
designate an order designating mode as the order accepting mode for the target service provider terminal, wherein under the order designating mode, the target service provider has a right to accept or reject an order which is directly designated to the target service provider terminal by the system;
generate a second order accepting interface corresponding to the order designating mode; and
send, via the network, the second order accepting interface to direct the target service provider terminal to display the second order accepting interface by displaying time information relating to an order in a first region of the second order accepting interface;
receive an acceptance of a service request initiated by a service requestor terminal from the target service provider terminal, wherein the target service provider accepts or strives for the service request via the first order accepting interface or the second order accepting interface; and
dispatch a vehicle corresponding to the target service provider terminal.

2. The system of claim 1, wherein the request for determining the order accepting mode includes a request for logging in the system.

3. The system of claim 1, wherein the at least one processor is directed further to:
compare a historical driving score associated with the target service provider terminal with a first threshold and a second threshold;
in response to a determination that the historical driving score associated with the target service provider terminal is smaller than the first threshold, designate an order quick-accepting mode as the order accepting mode for the target service provider terminal;
in response to a determination that the historical driving score associated with the target service provider terminal is larger than or equal to the first threshold and is smaller than or equal to the second threshold, designate the order designating mode as the order accepting mode for the target service provider; and
in response to a determination that the historical driving score associated with the target service provider terminal is larger than the second threshold, designate the order striving mode as the order accepting mode for the target service provider.

4. The system of claim 3, wherein the at least one processor is directed further to:
determine the historical driving score associated with the target service provider terminal based on historical service data associated with the target service provider terminal, a historical transaction rate associated with the target service provider terminal, and a driving score estimation model.

5. The system of claim 1, wherein the at least one processor is directed further to:
determine a second number count of unprocessed orders corresponding to the transport capacity of the geographical region;
determine whether the second number count of unprocessed orders is larger than or equal to an order threshold;
in response to a determination that the second number count of unprocessed orders is larger than or equal to the order threshold, designate an order quick-accepting mode as the order accepting mode for the target service provider terminal; and
in response to a determination that the second number count of unprocessed orders is smaller than the order threshold, designate the order designating mode as the order accepting mode for the target service provider terminal.

6. The system of claim 1, wherein the at least one processor is directed further to:
in response to a determination that the first number count of available service providers corresponding to the transport capacity of the geographical region is larger than or equal to the capacity threshold, switch the order accepting mode from the order designating mode to the order striving mode.

7. The system of claim 1, wherein the at least one processor is directed further to:
determine whether a historical driving score associated with the target service provider terminal is larger than or equal to a second threshold; and
in response to a determination that the historical driving score associated with the target service provider terminal is larger than or equal to the second threshold, switch the order accepting mode from the order designating mode to the order striving mode.

8. The system of claim 1, wherein
to send the first order accepting interface to direct the target service provider terminal to display the first order accepting interface, the at least one processor is further directed to:
instruct the target service provider terminal to display an order striving identifier in a second region of the first order accepting interface, or
to send the second order accepting interface to direct the target service provider terminal to display the second order accepting interface, the at least one processor is further directed to:
instruct the target service provider terminal to display an order accepting identifier in a second region of the second order accepting interface.

9. The system of claim 1, wherein under the order designating mode, an order is transmitted via the online to offline service platform to a service provider terminal, and designated to the service provider terminal upon receiving an acceptance of the order in a predetermined time period.

10. The system of claim 1, wherein under the order striving mode, an order is broadcasted via the online to offline service platform to a plurality of service provider terminals, and designated to a service provider terminal of the plurality of service provider terminals that responds first.

11. The system of claim 3, wherein under the order quick-accepting mode, an order is directly designated to a service provider terminal.

12. The system of claim 1, wherein the at least one storage medium further includes a second set of instructions for broadcasting a target order, wherein when the at least one processor executes the second set of instructions, the at least one processor is further directed to:
receive a target order from a service requester terminal, wherein the target order is associated with a target starting location;
determine an order broadcasting mode for the target order;

identify a plurality of candidate service provider terminals within a predetermined range around the target starting location;

for each of the plurality of candidate service provider terminals, execute the first set of instructions to determine an order accepting mode;

identify, from the plurality of candidate service provider terminals, one or more service provider terminals having an order accepting mode corresponding to the order broadcasting mode for the target order; and broadcast the target order to the one or more identified service provider terminals.

13. The system of claim 12, wherein to determine the order broadcasting mode for the target order, the at least one processor is further directed to:

determine a target transport capacity of a target geographical region around the target starting location; and determine the order broadcasting mode for the target order based on the target transport capacity of the target geographical region.

14. The system of claim 13, wherein to determine the order broadcasting mode for the target order based on the target transport capacity of the target geographical region, the at least one processor is further directed to:

determine a third number count of available service providers corresponding to the target transport capacity of the target geographical region;

determine whether the third number count of available service providers is larger than or equal to a capacity threshold;

in response to a determination that the third number count of available service providers is larger than or equal to the capacity threshold, designate a first broadcasting mode corresponding to the order striving mode as the order broadcasting mode for the target order; and in response to a determination that the third number count of available service providers is smaller than the capacity threshold, designate a second broadcasting mode corresponding to the order designating mode as the order broadcasting mode for the target order.

15. The system of claim 13, wherein to determine the order broadcasting mode for the target order based on the target transport capacity of the target geographical region, the at least one processor is further directed to:

determine a fourth number count of unprocessed orders corresponding to the target transport capacity of the target geographical region;

determine whether the fourth number count of unprocessed orders is larger than or equal to an order threshold;

in response to a determination that the fourth number count of unprocessed orders is larger than or equal to the order threshold, designate a third broadcasting mode corresponding to the order quick-accepting mode as the order broadcasting mode for the target order; and in response to a determination that the fourth number count of unprocessed orders is smaller than the order threshold, designate a second broadcasting mode corresponding to the order designating mode as the order broadcasting mode for the target order.

16. A method for determining an order accepting mode implemented on a computing device having at least one processor, at least one storage medium, and an online to offline service platform connected to a network, the method comprising:

receiving a request for determining an order accepting mode for a target service provider terminal;

determining a first number count of available service providers corresponding to a transport capacity of a geographical region based on real-time collection of positioning signals of available service provider terminals in the geographical region via a network;

determining whether the first number count of available service providers is larger than or equal to a capacity threshold;

in response to a determination that the first number count of available service providers is larger than or equal to the capacity threshold, designating an order striving mode as the order accepting mode for the target service provider terminal, wherein under the order striving mode, the target service provider terminal receives an order that is sent to multiple service provider terminals, each service provider associated with one of the service provider terminals has a right to decide whether to strive to accept the order;

generating a first order accepting interface corresponding to the order striving mode; and sending, via the network, the first order accepting interface to direct the target service provider terminal to display the first order accepting interface by displaying distance information of an order in a first region of the first order accepting interface, wherein the distance information provides a reference for the target service provider to decide whether to strive for the order; and in response to a determination that the first number count of available service providers is smaller than the capacity threshold, designating an order designating mode as the order accepting mode for the target service provider, wherein under the order designating mode, the target service provider has a right to accept or reject an order which is directly designated to the target service provider terminal by the system;

generating a second order accepting interface corresponding to the order designating mode; and sending, via the network, the second order accepting interface to direct the target service provider terminal to display the second order accepting interface by displaying time information relating to an order in a first region of the second order accepting interface;

receiving an acceptance of a service request initiated by a service reguestor terminal from the target service provider terminal, wherein the target service provider accepts or strives for the service request via the first order accepting interface or the second order accepting interface; and dispatching a vehicle corresponding to the target service provider terminal.

17. A non-transitory computer readable medium, comprising at least one set of instructions for determining an order accepting mode for a service provider, wherein when executed by at least one processor of a computer device, the at least one set of instructions directs the at least one processor to:

receive a request for determining an order accepting mode for a target service provider terminal;

determine a first number count of available service providers corresponding to a transport capacity of a geographical region based on real-time collection of positioning signals of available service provider terminals in the geographical region via a network;

determine whether the first number count of available service providers is larger than or equal to a capacity threshold;

in response to a determination that the first number count of available service providers is larger than or equal to the capacity threshold, designate an order striving mode as the order accepting mode for the target service provider terminal, wherein under the order striving mode, the target service provider terminal receives an order that is sent to multiple service provider terminals, each service provider associated with one of the service provider terminals has a right to decide whether to strive to accept the order;

generate a first order accepting interface corresponding to the order striving mode; and send, via the network, the first order accepting interface to direct the target service provider terminal to display the first order accepting interface by displaying distance information of an order in a first region of the first order accepting interface, wherein the distance information provides a reference for the target service provider to decide whether to strive for the order; and in response to a determination that the first number count of available service providers is smaller than the capacity threshold, designate an order designating mode as the order accepting mode for the target service provider terminal, wherein under the order designating mode, the target service provider has a right to accept or reject an order which is directly designated to the target service provider terminal by the system;

generate a second order accepting interface corresponding to the order designating mode; and send, via the network, the second order accepting interface to direct the target service provider terminal to display the second order accepting interface by displaying time information relating to an order in a first region of the second order accepting interface;

receive an acceptance of a service request initiated by a service requestor terminal from the target service provider terminal, wherein the target service provider accepts or strives for the service request via the first order accepting interface or the second order accepting interface; and dispatch a vehicle corresponding to the target service provider terminal.

18. The method of claim 16, the method further comprising:

comparing a historical driving score associated with the target service provider terminal with a first threshold and a second threshold;

in response to a determination that the historical driving score associated with the target service provider terminal is smaller than the first threshold, designating an order quick-accepting mode as the order accepting mode for the target service provider terminal;

in response to a determination that the historical driving score associated with the target service provider terminal is larger than or equal to the first threshold and is smaller than or equal to the second threshold, designating the order designating mode as the order accepting mode for the target service provider; and in response to a determination that the historical driving score associated with the target service provider terminal is larger than the second threshold, designating the order striving mode as the order accepting mode for the target service provider.

19. The method of claim 16, the method further comprising:

determining a second number count of unprocessed orders corresponding to the transport capacity of the geographical region;

determining whether the second number count of unprocessed orders is larger than or equal to an order threshold;

in response to a determination that the second number count of unprocessed orders is larger than or equal to the order threshold, designating an order quick-accepting mode as the order accepting mode for the target service provider terminal; and in response to a determination that the second number count of unprocessed orders is smaller than the order threshold, designating the order designating mode as the order accepting mode for the target service provider terminal.

20. The method of claim 16, the method further comprising:

in response to a determination that the first number count of available service providers corresponding to the transport capacity of the geographical region is larger than or equal to the capacity threshold, switching the order accepting mode from the order designating mode to the order striving mode.

\* \* \* \* \*